US009424665B1

(12) United States Patent
Frazier et al.

(10) Patent No.: US 9,424,665 B1
(45) Date of Patent: Aug. 23, 2016

(54) SYSTEM AND METHOD FOR SIGNALS TRANSMISSION IN COMPLEX SCATTERING ENVIRONMENTS USING INTERACTION OF THE WAVES WITH A NONLINEAR OBJECT

(71) Applicant: UNIVERSITY OF MARYLAND, College Park, MD (US)

(72) Inventors: Matthew Frazier, Greenbelt, MD (US); Biniyam TesFaye Taddese, Hyattsville, MD (US); Steven Mark Anlage, Laurel, MD (US)

(73) Assignee: University of Maryland, College Park, MD (US)

( * ) Notice: Subject to any disclaimer, the term of this patent is extended or adjusted under 35 U.S.C. 154(b) by 384 days.

(21) Appl. No.: 14/147,993

(22) Filed: Jan. 6, 2014

Related U.S. Application Data

(60) Provisional application No. 61/749,072, filed on Jan. 4, 2013.

(51) Int. Cl.
*G01S 7/52* (2006.01)
*G06T 11/00* (2006.01)

(52) U.S. Cl.
CPC .......... *G06T 11/005* (2013.01); *G01S 7/52038* (2013.01); *G01S 7/52046* (2013.01); *G01S 7/52049* (2013.01); *G01V 2210/588* (2013.01)

(58) Field of Classification Search
CPC ............ G01S 7/52038; G01S 7/52039; G01S 7/52046; G01S 7/52049; G01V 2210/588; G06T 11/005
See application file for complete search history.

(56) References Cited

U.S. PATENT DOCUMENTS 5,980,457 A * 11/1999 Averkiou ............ G01S 7/52038
600/437
8,558,661 B2 10/2013 Zeine

OTHER PUBLICATIONS

Mathias Fink, Time-reversal acoustics in complex environments, Geophysics, vol. 71, No. 4 (Jul.-Aug. 2006).
Mathias Fink, Time Reversed Acoustics, Physics Today 50(3), 34 (1997).
Mathias Fink, et al., Time-reversed acoustics, Rep. Prog. Phys. 63 (2000) 1993-1995.
Geoffroy Lerosey, et al., Focusing Beyond the Diffraction Limit with Far-Field Time Reversal, Science, vol. 315, Feb. 23, 2007.
(Continued)

*Primary Examiner* — Luke Ratcliffe
*Assistant Examiner* — Hovhannes Baghdasaryan
(74) *Attorney, Agent, or Firm* — Rosenberg, Klein & Lee

(57) ABSTRACT

A system and method for safe communication in a complex scattering environment is achieved by means of providing a passive nonlinear object in the wave propagation environment which nonlinearly interacts with the waves to create an exclusive communication channel between the nonlinear object and any point where the waves can be collected. Excitations generated by the nonlinearity in the time-reversal mirror are gathered, time-reversed, and retransmitted into the environment. The retransmitted signals arrive and are reconstructed exclusively at the location of the nonlinear object or linear object depending on the linearity or nonlinearity of the retransmitted sonas. The principles of the system and method are useful in numerous applications where signal communication or power delivery is desired to an object whose location is not known or dynamically changed in an exclusive, highly localized, precise, and secure fashion.

21 Claims, 24 Drawing Sheets

(56) References Cited

OTHER PUBLICATIONS

Fabrice Lemoult, et al., Resonant Metalenses for Breaking the Diffraction Barrier, Physical Review Letters, PRL 104, 203901 (2010).
Fabrice Lemoult, et al., Acoustic Resonators for Far-Field Control of Sound on a Subwavelength Scale, Physical Review Letters, PRL 107, 064301 (2011).
G. Lerosey, et al., Time Reversal of Electromagnetic Waves, Physical Review Letters, vol. 92, No. 19 (2004).
Carsten Draeger and Mathias Fink, One Channel Time Reversal of Elastic Waves in a Chaotic 2D-Silicon Cavity, Physical Review Letters, vol. 79, No. 3 (1997).
B.T. Taddese, et al., Chaotic Time-Reversed Acoustics: Sensitivity of the Loschmidt Echo to Pertubations, Acta Physica Polonica A, vol. 116, No. 5 (2009).
Biniyam Tesfaye Taddese, et al., Sensor based on extending the concept of fidelity to classical waves, Applied Physics Letters, 95, 114103 (2009).
Biniyam Tesfaye Taddese, et al., Sensing small changes in a wave chaotic scattering system, Journal of Applied Physics, 108, 114911 (2010).
Steven M. Anlage, et al., New Results in Chaotic Time-Reversed Electromagnetics: high Frequency One-Recording Channel Time-Reversal Mirror, Acta Physica Polonica A, vol. 1412, No. 4 (2007).
B.T. Taddese, et al., Iterative time reversal with tunable convergence, Electronics Letters, Oct. 13, 2011, vol. 47, No. 21.
Antares Parvulescu, Matched-signal ("MESS") processing by the ocean, J. Acoust. Soc. Am., 98 (2), Pt. 1, Aug. 1995.
Darrell R. Jackson and David R. Dowling, Phase Conjugation in underwater acoustics, J. Acoust. Soc. Am. 89(1), Jan. 1991.
Peter Blomgren and George Papanicolaou, Super-resolution in time-reversal acoustics, J. Acoust. Soc. Am. 111 (1), Pt. 1, Jan. 2002.
Seth D. Cohen, et al., Subwavelength Position Sensing Using Nonlinear Feedback and Wave Chaos, Physical Review Letters, PRL 107, 254103 (2011).
Matthew Frazier, et al., Nonlinear Time Reversal in a Wave Chaotic System, Physical Review Letters, PRL 110, 063902 (2013).
Mickael Tanter, et al., Breaking of time reversal invariance in nonlinear acoustics, Physical Review, E. vol. 64, 016602 (2001).
Andrew P. Brysev, et al., Focused nonlinear phase-conjugate waves generated by a solid parametric amplifier, J. Acoust. Soc. Am., 118 (6), Dec. 2005.
T.J. Ulrich and P.A. Johnson, Imaging nonlinear scatters applying the time reversal mirror, J. Acoust. Soc. Am. 119(3), Mar. 2006.
Antonio S. Gliozzi, et al., Efficiency of time-reversed acoustics for nonlinear damage detection in solids, J. Acoust. Soc. Am. 120 (5), Nov. 2006.
T.J. Ulrich, et al., Interaction Dynamics of Elastic Waves with a Complex Nonlinear Scatterer through the Use of a Time Reversal Mirror, Physical Review Letters, PRL 98, 104301 (2007).
T. Goursolle, et al., Non-linear based time reversal acoustic applied to crack detection: Simulations and experiments, International Journal of Non-Linear Mechanics 43 (2008) 170-177.
M. Scalerandi, et al., Nonlinear acoustic time reversal imaging using the scaling subtraction method, J. Phys. D: Appl. Phys. 41 (2008).
P.Y. Le Bas, et al., Probing the interior of a solid volume with time reversal and nonlinear elastic wave spectroscopy, J. Acoust. Soc. Am. 130 (4), Oct. 2011.
Francesco Ciampa and Michele Meo, Nonlinear elastic imaging using reciprocal time reversal and third order symmetry analysis, J. Acoust. Soc. Am. 131 (6), Jun. 2012.
Chia-Lung, et al., Digital phase conjugation of second harmonic radiation emitted by nanoparticles in turbid media, Optics Express, vol. 18, No. 12, Jun. 7, 2010.
Xin Yang, Three-dimensional scanning microscopy through thin turbid media, Optics Express, vol. 20, No. 3, Jan. 30, 2012.
Xiao Xu, et al., Time-reversed ultrasonically encoded optical focusing into scattering media, Nature Photonics, vol. 5, Mar. 2011.
Matthew Frazier, et al., Nonlinear time reversal of classical waves: Experiment and model, Physical Review E 88, 062910 (2013).

\* cited by examiner

Sent Linear Image

Linear Image, Linear Port

Nonlinear Image, Linear Port

Sent Nonlinear Image

Linear Image, Nonlinear Port

Nonlinear Image, Nonlinear Port

Sent Linear Image

Linear Image, Linear Port

Nonlinear Image, Linear Port

Sent Nonlinear Image

Linear Image, Nonlinear Port

Nonlinear Image, Nonlinear Port

Sent Linear Image

Received Linear Image At Source

Received Nonlinear Image At Source

Sent Nonlinear Image

Received Linear Image At Diode

Received Nonlinear Image At Diode

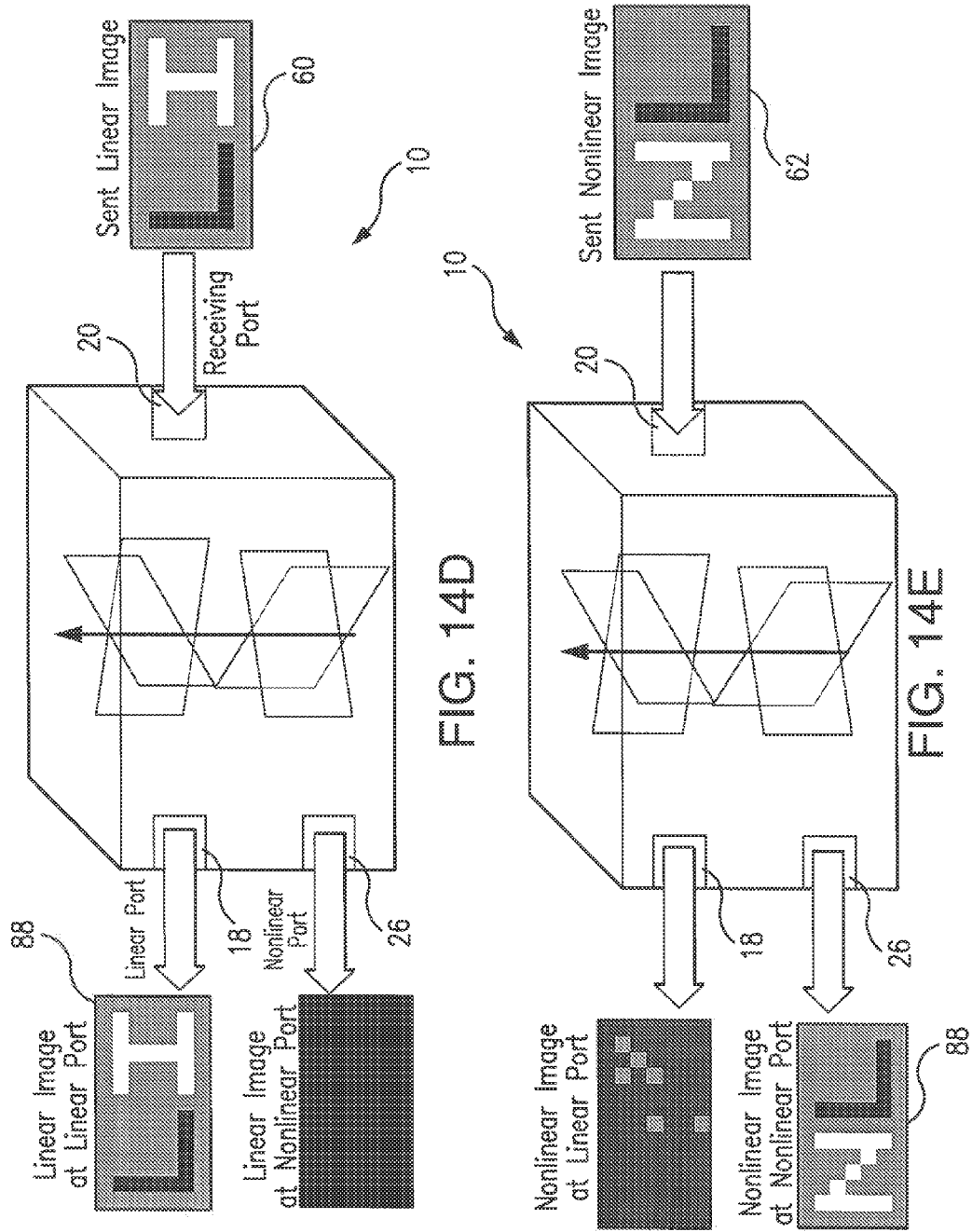

MODEL

SYSTEM AND METHOD FOR SIGNALS TRANSMISSION IN COMPLEX SCATTERING ENVIRONMENTS USING INTERACTION OF THE WAVES WITH A NONLINEAR OBJECT

REFERENCE TO THE RELATED APPLICATIONS

This Utility Patent Application is based on a Provisional Patent Application No. 61/749,072 filed on 4 Jan. 2013.

STATEMENT REGARDING FEDERALLY SPONSORED RESEARCH OR DEVELOPMENT

The development of the invention described herein was funded by CIA under Contract No. 2010104210600. The U.S. Government has certain rights in this invention.

FIELD OF THE INVENTION

The present invention is directed to communication in wave-chaotic environments; and in particular, to transmission of signals and/or energy pulses in complicated wave propagation environments towards a specific object, and/or to an object with an unknown or dynamically changing location through an exclusive communication channel formed between communicating objects.

More in particular, the present invention is directed to a communication system which is based on a concept of creation of an exclusive communication channel which is impervious to eavesdropping by a third party between a passive nonlinear object exposed to waves propagating in an environment of interest and any point where the waves can be collected.

The present invention is also directed to a communication system where an exclusive communication channel is created between two (or more) parties based on a wave-enabled interaction with a signal source having nonlinear dynamics, that does not require knowledge of the location of the nonlinear source of the signal.

In addition, the present invention is directed to a communication system and method in which the communication is established with an object whose location is not known, such as, for example, in the wireless power transfer to a specific object, to a device whose location may dynamically change, images or coded signals transmission exclusively to intended recipients, precise delivery of energy pulses for disabling/disruption of a recipient device operation whose location may not be known, non-invasive treatment of tumors through highly localized delivery of focused energy beams to tumors location, and other numerous secure and precise communication applications using wave-enabled exclusive communication channel established in ray-chaotic environments of different nature including electromagnetic, acoustic, seismic, quantum mechanical, biological, etc., waves propagating environments.

Further, the present invention is directed to waves transmission in a closed wave-chaotic environment (constructed as a time-reversal mirror) containing a passive harmonic-generating nonlinearity, in which excitations generated by the nonlinearity, when exposed to the waves, are gathered at a receiving port, filtered to extract a sona corresponding to the nonlinearity harmonics, time-reversed, transmitted from the receiving port into the environment, and reconstructed exclusively at the location of the nonlinearity.

BACKGROUND OF THE INVENTION

The time-reversal and reciprocal properties of the lossless linear wave equation can be utilized to achieve useful effects even in wave-chaotic systems [E. Ott, *Chaos in Dynamical Systems* (Cambridge University Press, New York, 1993); H.-J. Stöckmann, *Quantum Chaos: An introduction* (Cambridge University Press, New York, 1999); Y. V. Fyodorov and D. V. Savin, in *The Oxford Handbook of Random Matrix Theory*, edited by G. Akemann, J. Baik, and P. Di Francesco (Oxford University Press, New York, 2011)] typically endowed with complex boundaries and inhomogeneities [M. Fink, Geophysics 71, SI151 (2006); M. Fink, Phys. Today 50, 34 (1997); M. Fink, et al., Rep. Prog. Phys. 63, 1933 (2000); G. Lerosey, et al., Science 315, 1120 (2007); F. Lemoult, et al., Phys. Rev. Lett. 104, 203901 (2010); F. Lemoult, et al., Phys. Rev. Lett 107, 064301 (2011); G. Lerosey, et al., Phys. Rev. Lett. 92, 193904 (2004); and C. Draeger et al., Phys. Rev. Lett. 79, 407 (1997)]. Wave equations without dissipation are invariant under time reversal. Given any time-forward solution considered as a superposition of traveling waves, there exists a corresponding time-reversed solution in which the individual superposed traveling waves propagate backwards retracing the trajectories of the timeforward solution.

This allows the construction of a time-reversal mirror. In an imaginary ideal situation, one transmits a wave form of finite duration from a localized source in the presence of perfectly reflecting objects and then receives the resulting reverberating wave forms (referred to as the sona) on an array of ideal receivers completely enclosing the region where the source and reflecting objects are located.

After the reverberations "die out", one then transmits (in the opposite direction) the time-reversed sona signals from the array of receivers. This newly transmitted set of signals essentially undoes the time-forward propagation, producing waves which converge on the original localized source, reconstructing a time-reversed version of the original signal at the localized source. Although real situations deviate from the above described ideal, time reversal in this manner has been effectively realized in acoustics [M. Fink, Geophysics 71, SI151 (2006); M. Fink, Phys. Today 50, 34 (1997); M. Fink, et al., Rep. Prog. Phys. 63, 1933 (2000); G. Lerosey, et al., Science 315, 1120 (2007); F. Lemoult, et al., Phys. Rev. Lett. 104, 203901 (2010); F. Lemoult, et al., Phys. Rev. Lett 107, 064301 (2011); G. Lerosey, et al., Phys. Rev. Lett. 92, 193904 (2004); C. Draeger, et al., Phys. Rev. Lett. 79, 407 (1997); B. T. Taddese, et al., Acta Phys. Pol. A 116, 729 (2009); B. T. Taddese, et al., App. Phys. Let. 95, 114103 (2009); and B. T. Taddese, et al., J. Appl. Phys. 108, 114911 (2010)] and electromagnetic waves [F. Lemoult, et al., Phys. Rev. Lett. 104, 203901 (2010); G. Lerosey, et al., Phys. Rev. Lett. 92, 193904 (2004); S. M. Anlage, et al., Acta Phys. Pol. A 112, 569 (2007); and B. T. Taddese, et al., Electron. Lett. 47, 1165 (2011)], and applications such as lithotripsy [M. Fink, Geophysics 71, SI151 (2006); and M. Fink, et al., Rep. Prog. Phys. 63, 1933 (2000)], underwater communication [M. Fink, Geophysics 71, SI151 (2006); A. Parvulescu, J. Acoust. Soc. Am. 98, 943 (1995); and R. Jackson, et al., J. Acoust. Soc. Am. 89, 171 (1991)], sensing small perturbations [B. T. Taddese, et al., Acta Phys. Pol. A 116, 729 (2009); B. T. Taddese, et al., App. Phys. Let. 95, 114103 (2009); and B. T. Taddese, et al., J. Appl. Phys. 108, 114911 (2010)], and achieving subwavelength imaging [F. Lemoult, et al., Phys. Rev. Lett. 104, 203901 (2010); F. Lemoult, et al., Phys. Rev. Lett 107, 064301 (2011); G. Lerosey, et al., Phys. Rev. Lett. 92, 193904 (2004); and P. Blomgren, et al., J. Acoust. Soc. Am. 111, 230 (2002)] have been developed.

Ideally, for a perfect time-reversal mirror, a large number of receivers are required to collect the sona signals, and the receivers need to cover a surface completely surrounding the source and any reflecting objects (which reflect without loss).

A significant simplification is to enclose the system in a closed, ray-chaotic environment with highly reflecting boundaries. For wavelengths smaller than the enclosure size, propagating waves will (over a sufficiently long duration) reach every point in the environment, allowing a single wave-absorbing receiver to record a single time-reversible sona signal over a long duration of time [C. Draeger, et al., Phys. Rev. Lett. 79, 407 (1997); B. T. Taddese, et al., Acta Phys. Pol. A 116, 729 (2009)].

It has been found that in the presence of boundary reflection loss, a high-quality version of the basic time-reversal reconstruction still occurs at the source, and reception of only a small fraction of the transmitted energy is sufficient for reconstruction of the initial wave form at the source. Nevertheless, such a time-reversal mirror still requires an active source to generate the sona signal. In some cases, it would be better if this step could be eliminated, further simplifying the time-reversal mirror.

Recent studies have investigated the addition of discrete elements with complex nonlinear dynamics to otherwise linear wave-chaotic systems [S.D. Cohen, et al., Phys. Rev. Lett. 107, 254103 (2011); and M. Frazier, et al., Phys. Rev. Lett. 110, 063902 (2013)]. When a discrete nonlinear element is added to the system, excitations at new distinct frequencies are generated from the interaction of the initial wave form with the nonlinear element. This appears as a radiated signal originating at the location of the nonlinear element (which in principle may be unknown). The new wave form propagates through a linear medium and, when time-reversed and retransmitted, will reconstruct the excitations generated at the nonlinear element. This form of nonlinear time reversal differs from wave propagation through a distributed nonlinear medium, in which the time-reversal invariance breaks when shock waves form [M. Tanter, et al., Phys. Rev. E. 64, 016602 (2001); and A. P. Brysev, et al., J. Acoust. Soc. Am. 118, 3733 (2005)].

Time reversal in systems with localized nonlinearities has been demonstrated in several systems, including acoustic waves through materials with defects [T. J. Ulrich, et al., J. Acoust. Soc. Am. 119, 1514 (2006); A. S. Gliozzi, et al., ibid. 120, 2506 (2006); T. J. Ulrich, et al., Phys. Rev. Lett. 98, 104301 (2007); and T. Goursolle, et al., Int. J. Non-Linear Mech. 43, 170 (2008)], as a means of nondestructive evaluation [M. Scalerandi, et al., J. Phys. D: Appl. Phys. 41, 215404 (2008); P. Y. Le Bas, et al., J. Acoust. Soc. Am. 130, EL258 (2011); and F. Ciampa et al., ibid. 131, 4316 (2012)], phase conjugation of light harmonically generated from a nanoparticle [C.-L. Hsieh, et al., Opt. Express 18, 12283 (2010); and X. Yang, et al., ibid. 20, 2500 (2012)], and phase conjugation of acoustically modulated light using a focused ultrasonic signal as a "guide star" for the time-reversed focusing [X. Xu, et al., Nature Photonics 5, 154 (2011)].

In [M. Frazier, et al., Phys. Rev. Lett. 110, 063902 (2013)], nonlinear time reversal was performed using microwaves incident upon a harmonically driven diode, generating intermodulation products. A drawback of the technique is the need to use an active nonlinearity (a driven diode to create intermodulation products) instead of a completely passive element. Also missing is a quantitative model to describe and understand the nonlinear time-reversal physics. Furthermore, the technique was applied to develop a method of exclusive communication, which appears to be rate limited by the length of the sonas necessary to transmit information.

It is therefore desirable to create a wave chaotic system with a passive discrete nonlinear element in a nonlinear time-reversal mirror, and to construct a model system to simulate propagation through the nonlinear wave-chaotic system in question.

SUMMARY OF THE INVENTION

It is an object of the present invention to provide a communication method and system which uses the interaction of a passive nonlinear object with a waves (including pulsed waves) propagating in a complex scattering environment to create an exclusive communication channel between the nonlinear object and a receiving entity, where the knowledge of the location of the nonlinear source is not required, and where the exclusive communication channel is impervious to eavesdropping by a third party.

It is another object of the present invention to provide a communication system and method in which a passive nonlinear discrete source, being exposed to waves propagating in a wave propagating environment of interest, produces excitations generated from the interaction of an incident wave with the nonlinear element. These interaction excitations propagate in the wave propagating environment of interest and are received at a receiving port, where they are time-reversed, retransmitted therefrom, and then reconstruct exclusively at the nonlinear element.

It is an additional object of the present invention to provide a signal transmission system and method capable of establishing an exclusive wave-enabled communication channel between a nonlinear signal source exposed to waves propagating in the environment of interest and a receiving port, which may find utility in communication systems where the location of a signal source is unknown or dynamically changing, and/or for telemetrical disruption or disablement of the operation of electronic devices, and/or in medical field for non-invasive removal of tumors in a highly precise manner without harming surrounding healthy tissues, as well as in secure wireless power (or signal) transmission from a source to a remote user.

It is a further object of the present invention to provide a method and system for transmitting information encoded in an nonlinear sona, explore the extent to which the recorded length of the sona limits the rate of information transfer, and demonstrate the ability to reconstruct overlapped sonar into distinct pulses, allowing for compressing a number of bits of information into a given sona length.

In one aspect, the present invention is a method of signals transmission in wave propagating environments capable of establishing a wave-enabled exclusive communication channel with an object whose location is not known. The subject method is carried out through the steps of:

exposing a non-linear (preferably, passive) object to waves (including pulsed waves) propagating in a wave propagating environment of interest, thereby inducing a pulsed nonlinear response at the nonlinear object, i.e., causing generation of intermodulation product signals and/or pulsed harmonic signals originating at the nonlinear object and propagating to a receiving (transceiver) port provided in the wave propagating environment of interest; and detecting, at the receiving port, a full sona signal including at least one nonlinear sona corresponding to the intermodulation product (or harmonic) signals, and a linear sona corresponding to the waves reverberating in the linear waves propagating environment of interest.

The method proceeds by:

Extracting the nonlinear sona from the full sona signal at the receiving port;

time-reversing the nonlinear sona; and transmitting the time-reversed nonlinear sona from the transmitter at the receiving port into the wave propagating environment of interest, where the time-reversed nonlinear sona propagates in the wave propagating environment to, and reconstructs exclusively at, the location of the nonlinear object, thereby resulting in a reconstructed nonlinear time-reversed signal (also referred to herein as a replica), thereby establishing an exclusive wave-enabled communication channel between nonlinear object and the receiving port.

The method is further carried out using the steps of:

providing a linear port in the wave propagating environment of interest for transmission of the waves into the wave propagating environment of interest, extracting the linear sona from the full sona signal at the receiving port;

time-reversing the linear sona; and transmitting the time-reversed linear sona from the transmitter at the receiving port into the wave propagating environment of interest, where the time-reversed linear sona reconstruct exclusively at the linear port, thus obtaining a reconstructed linear time-reversed signal (also referred to herein as a replica) exclusively at the location of the linear port.

Preferably, the subject method uses the steps of:

applying Fast Fourier transform computation to the full sona signal detected at the receiving port, where the Fast Fourier Transform results in signals at the wave frequency $f_{pulse}$, harmonics of the excitations of the nonlinear object $f_{harmonic}$, and signals at intermodulation frequencies $f_{intermod}$.

In order to extract the nonlinear sona from the full sona signal, a band-pass filter centered at the $f_{harmonic}$ or $f_{intermod}$ frequency is applied to the full sona signal. Alternatively, in order to extract the linear sona from the detected full sona signal, a band-pass filter centered at the waves frequency $f_{pulse}$ is applied to the full sona signal.

The subject method may be applied in a pulse coded modulation regime for signals transmission through the steps of:

assigning a "1" bit value to the non-linear sona received and extracted at the receiving port, thereby creating a "1" bit sona, and creating a "0" bit sona from the nonlinear sona received and extracted at the receiving port through the following steps:

applying Fast Fourier transform to thereby transforming the nonlinear sona into the frequency domain, adding a random Gaussian noise to the phase information of the nonlinear sona in frequency domain, thereby creating a noisy-phase signal, and applying an Inverse Fast Fourier transform to the noisy-phase signal to transform the same into the time domain.

Subsequently, upon obtaining "1" and "0" bit sonas, a coded message is created including a series of the "1" bit sonas and the "0" bit sonas interposed in a predetermined sequence, and the coded message is transmitted from the transmitter at the receiving port into the waves propagating environment of interest.

The presence and absence of nonlinear time-reversed sona signals are detected at the nonlinear object, wherein the "1" bit sona signals in the coded message are reconstructed and detected at the nonlinear object, and the "0" bit sona signals in the coded message are not reconstructed at the nonlinear object. A processing unit operatively coupled to the nonlinear object decodes the presence and absence of reconstructions at the nonlinear object, and outputs the bit sequence.

The subject method is also applicable in image transmission. For this application, the method is carried out through the steps of:

creating an image intended to be delivered exclusively to the nonlinear object;

operatively coupling a processor unit to the receiving port, encoding the pixels in the images in the processing unit, and using the nonlinear sona, broadcasting the encoded image from the transmitter at the receiving port into the wave propagating environment of interest, thereby directing the image exclusively to the nonlinear object for reconstruction and subsequent processing of the reconstructed sonas at the processor unit.

In addition to using the nonlinear sona, the subject method can use a linear sona for exclusive transmission of images to the linear port. In this embodiment, an image to be delivered to the linear port is encoded at the processor unit operatively coupled at the receiving port, and the encoded image is broadcast from the transmitter at the receiving port using the linear sona into the wave propagating environment of interest, thereby directing the encoded image for reconstruction exclusively at the linear port.

The present method may be adapted for the applications where disabling or disruption of the operational mode of an electronic device is needed.

In this application, the method is carried out through the step of:

establishing the presence of a nonlinear object in the wave propagating environment of interest if frequency components outside the wave bandwidth are detected, amplifying and time-reversing the frequency components originating from the nonlinear object of interest, and transmitting the time-reversed and amplified signals into the environment of interest, where the amplified time-reversed signals are reconstructed at the nonlinear object, thereby affecting its operational mode.

The subject method may also find utility in highly localized non-invasive surgical procedures.

For example, for tumors removal, non-linear substances having non-linear dynamics (acoustic or electromagnetic nonlinearities) may be swallowed by a patient or injected in the blood system. These nonlinear substances, being introduced into the patient's body, are bio-chemically directed to and accumulated at the tumor location.

An external source of microwave/RF radiation may be coupled to the system, and a nonlinear time-reversal mirror may be established between the external power source (microwave/RF, or acoustic) and the tumor.

Low power RF/microwave (as well as acoustic) waves with time-reversed nonlinear sonas would be sent directly to the tumor location, in a precise localization manner, reconstructing as high energy density pulses exclusively at the location of accumulation of the nonlinear substance, i.e., the tumor. This energetic deposition could be used to destroy the tumor without affecting nearby healthy tissue.

The subject method is also applicable in wireless power transfer to a specific object, including power receiving object with unknown location. For this purpose, a rectifying antenna of an object receiving power is provided with a nonlinear "tag". This nonlinear "tag" is used to establish an exclusive "power link" from a power source to the object receiving power.

Energy is transferred to the rectifying antenna by sending a time-reversed nonlinear sona that reconstructs as an intense pulse at the rectifying antenna.

If the object receiving power has a dynamically changing location, it may be tracked by collecting new sonas to continuously re-establish the "power link".

The nonlinear objects may be of various origin, including diodes, transistors, electrostatic-discharge diodes, metal-insulator-metal junctions, active circuits (electromagnetic), cracks (acoustic), geological faults, mineral and petroleum deposits (seismic), or superconductors, superfluids, p/n junctions, quantum dots, nanoparticles (quantum mechanical), magnetic particles, biological, and bio-chemical substances.

In another aspect, the present invention constitutes a system for signals transmission in wave propagating environments. The signals transmission system comprises:

a non-linear object exposed to the waves (including pulsed waves) propagating in the wave propagation environment of interest, and produces intermodulation product and/or harmonic (including pulsed nonlinear response) signals originating thereat and propagating to a receiving port where the signals are collected, a signal detector at the receiving port which is configured to detect a full sona signal including nonlinear sona corresponding to the intermodulation product signal, harmonic signals, and a linear sona corresponding to the waves reverberating in the waves propagating environment of interest.

The system further includes:

a first bandpass filter centered at frequencies of the intermodulation product, or harmonics frequencies, signals. The first bandpass filter is applied to the full sona to extract at least one nonlinear sona therefrom.

A time-reversing unit is coupled to the receiving port and is configured to apply time-reverse procedure to the nonlinear sona.

A transmitter at the receiving port is operatively coupled to the time-reversing unit and is configured to transmit the time-reversed nonlinear sona into the waves propagation environment of interest. The transmitted time-reversed nonlinear sona propagates towards the location of the nonlinear object and reconstructs exclusively thereat, thus attaining an exclusive communication channel extending between the nonlinear object and the receiving port.

The subject system further includes:

a second bandpass filter centered at frequencies of the waves propagating in the wave propagation environment. The second filter is applied to the full sona to extract a linear sona therefrom. The linear sona is time-reversed in the time-reversing unit, transmitted by the transmitter unit into the waves propagating environment, and reconstructs exclusively at the location of a linear source of waves which may be of microwave, RF, EM, acoustic, seismic, etc., nature.

The system further includes a processor unit configured to apply time-reversing procedures to the extracted sonas, and to apply pulse code modulation routine to the nonlinear and/or linear sonas extracted from the full sona.

In one embodiment, the processor unit is configured to:

create a "1" bit sona from the nonlinear sona extracted from the full sona at the receiving unit, create a "0" bit sona by:

applying Fast Fourier transform to the nonlinear sona to transmit it into the frequency domain, adding a random Gaussian noise to the phase information of the nonlinear sona in frequency domain, thereby creating a noisy-phase signal, and applying Inverse Fast Fourier transform to the noisy-phase signal to transform it into the time domain.

The processor unit further is configured to create a coded message including a series of the "1" bit sonas and "0" bit sonas interposed in a predetermined sequence.

Upon transmitting the coded message from the transmitter at the receiving port into the waves propagating environment of interest, the presence and absence of the reconstructed nonlinear time-reversed sonas are detected (measured) at the location of the nonlinear object, where the "1" bit sonas are reconstructed and detected at the nonlinear object, and wherein the "0" bit sonas are not reconstructed at the nonlinear object. The processor unit translates the detected replicas into the bit sequence.

The subject system also may be used in image transmission to a desired location. The image transmitting system, based on the concept of the present invention, includes an image source operatively coupled to the receiving port. The image source supplies an image which is to be delivered to the location of the nonlinear object, a processor unit operatively coupled to the image source and the receiving port and configured for coding the image. Specifically, each pixel of the image may be coded by the nonlinear sona as, for example, the "0" bit and "1" bit approach described supra.

The transmitter unit at the receiving port is coupled to the processing unit for broadcasting a time-reversed coded image into the wave propagating environment, thereby "directing" the time-reversed coded image for reconstruction exclusively at the location of the nonlinear object.

The system is also useful in non-invasive surgical procedures, for example, for tumors removal. In this application, a nonlinear substance compatible with biological environment is introduced into a patient's body, and is bio-chemically directed to accumulate at the location of the tumor.

Using the principles of the present invention, the nonlinear substance at the tumor location, being exposed to electromagnetic waves, produced harmonics which are detected at the receiving port, and filtered to extract the nonlinear sona, which is time-reversed and retransmitted from the transmitter. The transmitted time-reversed nonlinear sona includes either low power RF or microwave radiation which is delivered to the tumor location and reconstructs exclusively at the tumor location. The radiation delivered to the tumor is of a sufficient power to ablate and destroy the tumor tissues. The system provides a highly localized non-invasive surgical procedure in which surrounding tissues are not affected.

These and other objects and advantages of the present invention will be apparent from further detailed description of the preferred embodiments taken in conjunction with the accompanying Patent Drawing figures.

BRIEF DESCRIPTION OF THE DRAWINGS

FIG. 3A is the experimental setup in the time-forward mode of operation, and FIG. 3B represents the experimental setup in the time-reversed mode of operation;

FIGS. 14A-14C show single, double and multiple pulse reconstructions, while

FIGS. 14D-14E illustrate another example of reconstruction of the images at the linear and nonlinear ports, respectively;

DETAILED DESCRIPTION OF THE PREFERRED EMBODIMENT

The principles of the present invention are applicable to environments with various types of propagating waves, including, but not limited to, electromagnetic, acoustic, seismic, quantum mechanical, biological, etc., waves. However, as one of numerous examples, for the purposes of simplifying the disclosure, but not to limit the scope of the invention to any particular type of waves, the electromagnetic waves propagating environment 10 will be referred to herein.

A communication system 10 is presented in FIGS. 1A-1B, 2A-2E, 3A-3D, and 14D-14E.

Figure 2A:
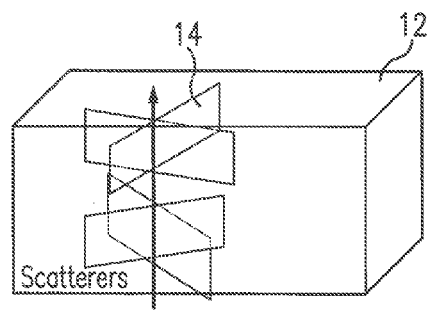
FIGS. 2A-2E represent experimental setup designed for demonstration of the concept of the present invention.
Figure 2B:
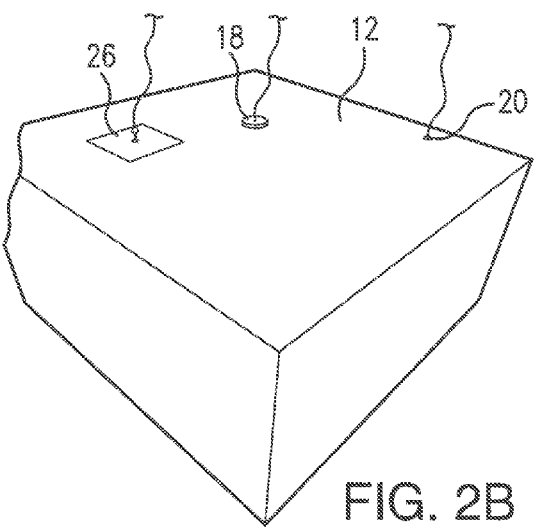
Figure 2C:
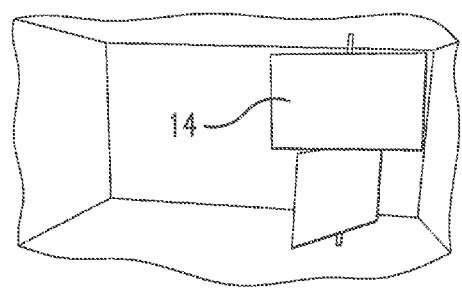
Figure 2D:
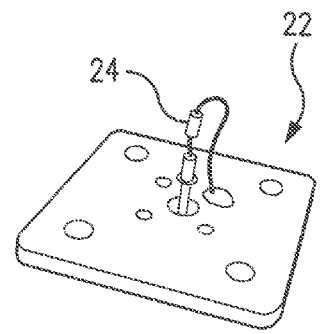
Figure 2E:
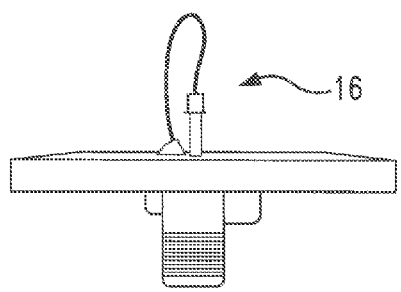

In order to demonstrate the principles of the presents invention, an experimental set-up has been built. Shown in FIG. 2A, is a schematic representation of the microwave enclosure 12 with scatterers. FIG. 2B shows an exterior view of the microwave enclosure 12, FIG. 2C illustrates the mode stirrers inside the enclosure 12, FIG. 2D is the representation of the loop antenna with a diode (nonlinear element), and FIG. 2E is the loop antenna without the diode (linear antenna). The complex scattering metal enclosure 12 was constructed in the form of an aluminum box with dimensions, for example, of 127 cm by 127 cm by 66 cm (volume of roughly 1.06 m³).

The design, dimension and materials of the experimental setup elements, as well as pulses frequencies, pulses duration and power, and specific equipment used in the experimental setup, are presented herein as an example for clarity, but not to limit the scope of the present invention to these specific arrangements.

Metallic mode-stirrers 14 were placed within the enclosure 12. Two 'linear' antennas 16 were built, for example, as 5 mm by 15 mm rectangular metal loops. The "linear antennas" were mounted to ports 18 and 20 on the inward sides of the box 12 at different, configurable locations.

A nonlinear element 22 built with a diode 24 (for example 1N4148 or NTE519) forming, for example, a 5 mm by 15 mm rectangular metal loop was mounted to a third port 26 inside the enclosure 12.

In addition to diodes, the nonlinear objects may be represented by transistors, electrostatic-discharge diodes, metal-insulator-metal junctions, active circuits (electromagnetic), cracks (acoustic), geological faults, mineral and petroleum deposits (seismic), superconductors, superfluids, pin junctions, quantum dots, nanoparticles (quantum mechanical), magnetic particles, and many other non-linear sources, including biological substances.

The present system and method may operate in pulsed waves propagating environments, where a pulse is introduced to the system to induce a pulsed nonlinear response at the nonlinear element. A time-reversed version of this nonlinear pulse is reconstructed at the location of the nonlinear element.

Figure 4:
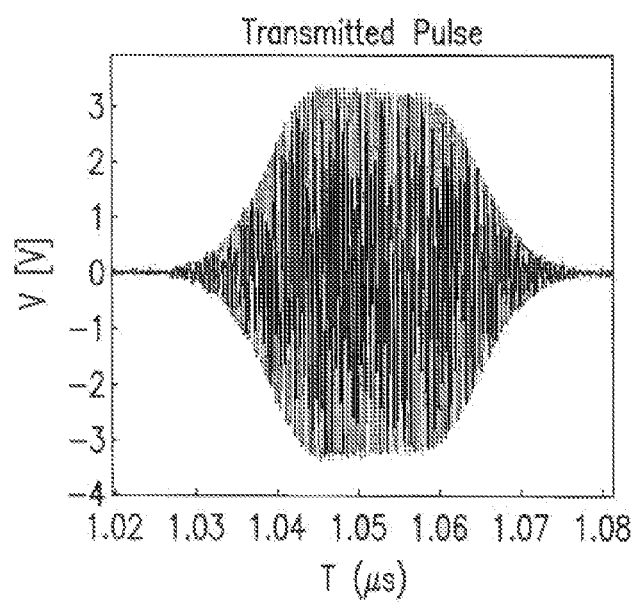
FIG. 4 is the diagram of the electromagnetic pulse (shown as a voltage waveform versus time) transmitted into the enclosure.
Figure 5:
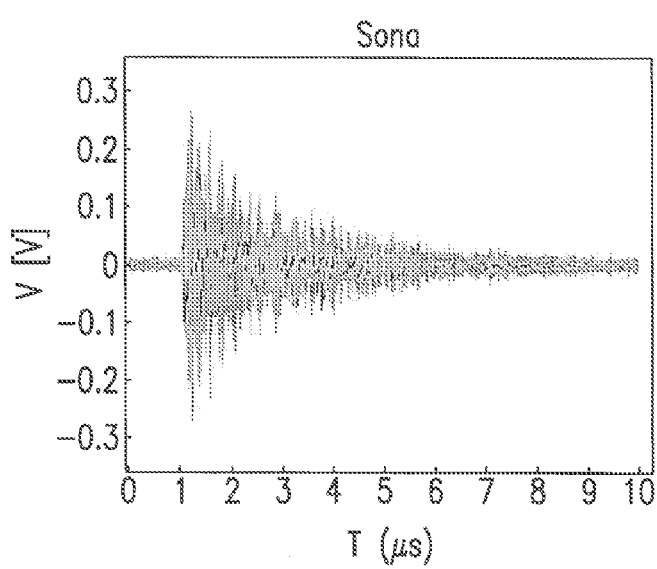
FIG. 5 is a diagram representing an example of a measured full sona signal measured at the receiving port.

A Gaussian-in-time electromagnetic pulse 28 was formed using, for example, a Tektronix AWG7052 arbitrary waveform generator (AWG) 30 and an Agilent E8267D Vector PSG microwave source 32, and transmitted into the enclosure 12 through the linear port 18 at a carrier frequency $f_{pulse}$=3.8 GHz, for a duration of 50 ns with a power of 25 dBm, as shown in FIG. 4.

A CW (continuous wave) tone 34 at the frequency $f_{diode}$=400 MHz and power of 20 dBm was transmitted through the nonlinear port 26 containing the diode 24. As the Gaussian pulse 28 reverberates through the enclosure 12, it is incident on the diode 24 and mixes with the CW tone 34 at the diode 24, generating intermodulation products 36, which originate from the diode 24 and reverberate throughout the enclosure 12. These reverberations 36 are received at the receiving port 20 and are recorded using an oscilloscope 38.

The recorded waveforms 40 (referred to as "full sona" shown in FIGS. 1A-1B, 3A and 5) are complicated waveforms that are unique to the scattering environment and unique to the source (nonlinear element) and detector (receiving port) locations.

Figure 1A:
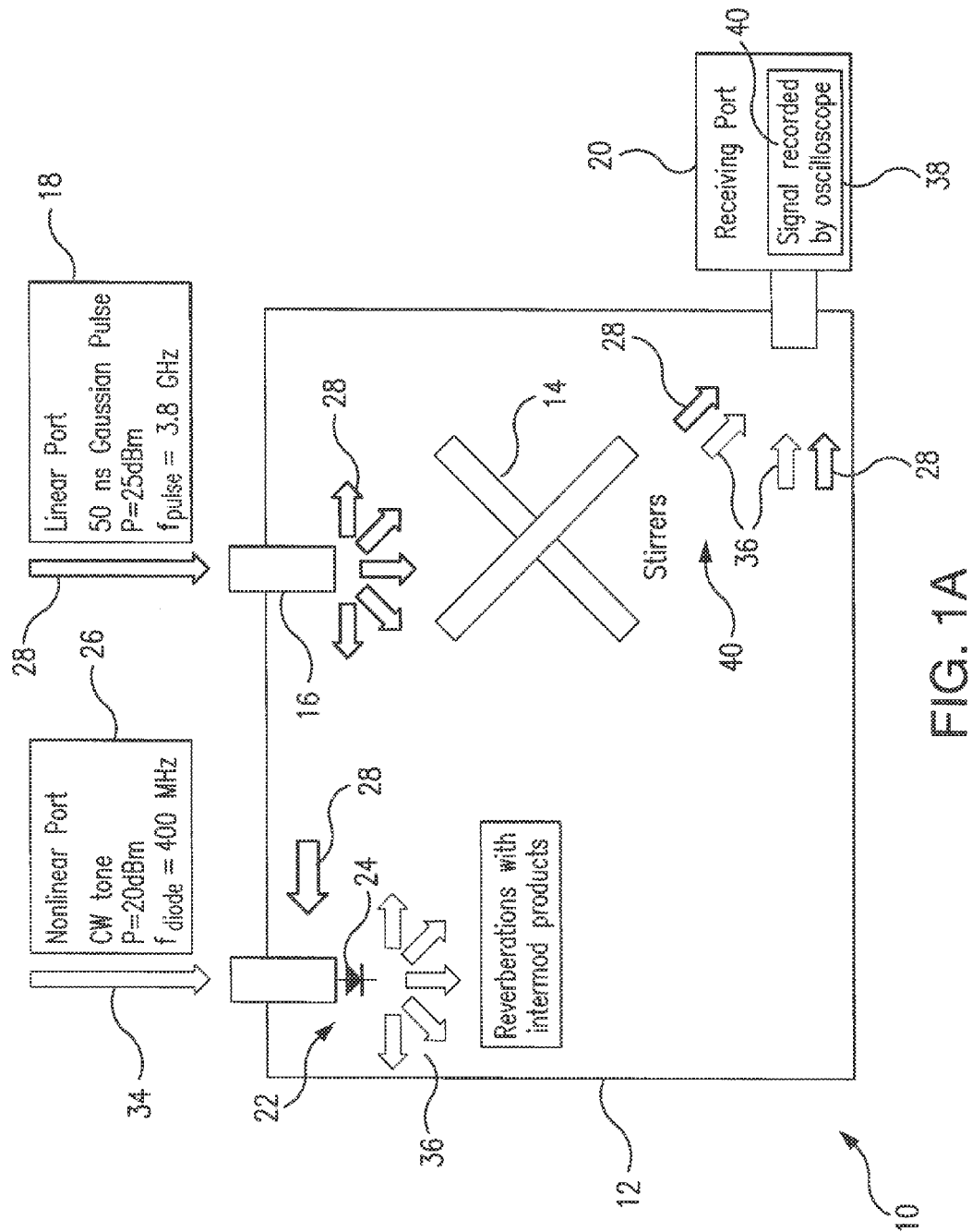
FIG. 1A is a simplified schematic representation of a ray-chaotic reverberant enclosure showing signals traveling in the enclosure.
Figure 1B:
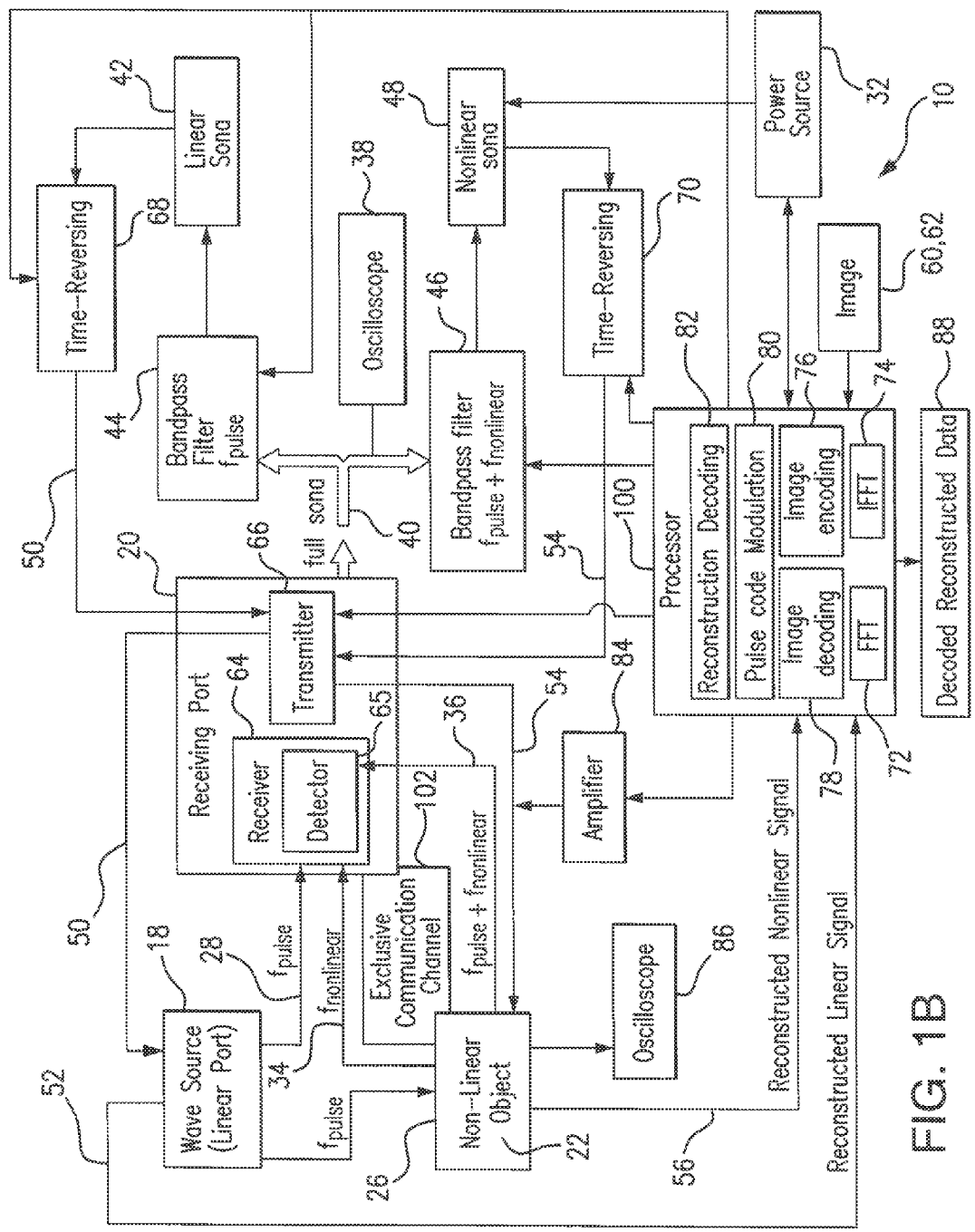
FIG. 1B is a simplified schematic representation of the principles underlying the functionality of the subject system.
Figures 6A, 6B:
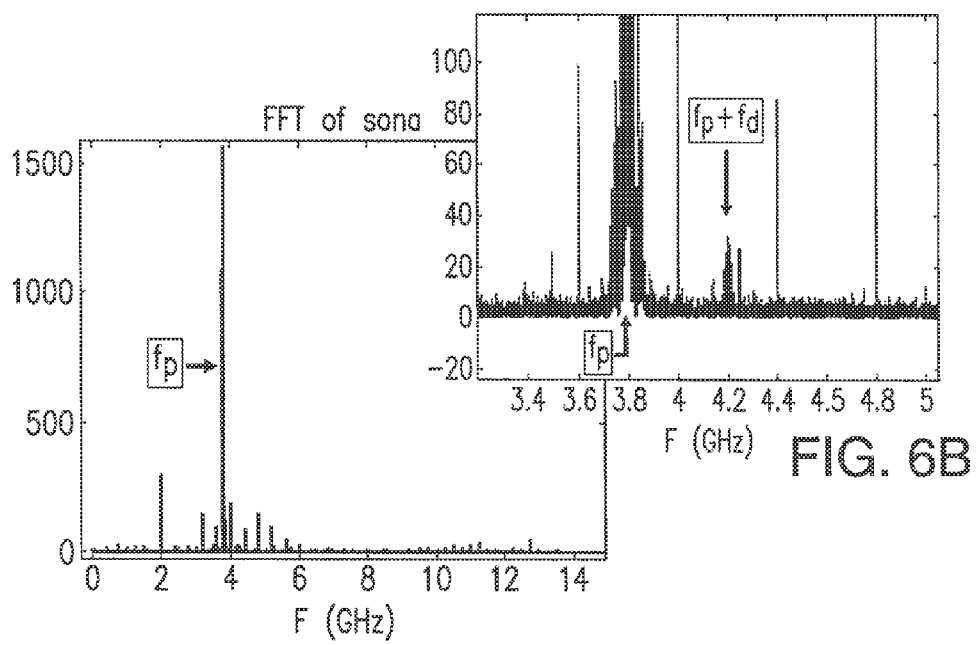
FIG. 6A-6B represent a diagram of a magnitude of the Fast Fourier transform of the sona shown in FIG. 5 as a function of frequency.

An example Fourier transform of such a signal is shown in FIGS. 6A-6B. As shown in FIGS. 1A-1B, and 6A, the Fourier transform detected by the detector unit 65 at the receiver 64 of the receiving port 20 (which is also referred to herein as a transceiver since it has the capabilities both of the receiver/detector of signals and the transmitter) consists of signals 28 at the carrier frequency $f_{pulse}$, harmonics 34 of the 400 MHz CW signal ($f_{nonlinear}$), and at intermodulation frequencies 36 of the two frequencies ($f_{pulse}+f_{nonlinear}$), arising from the nonlinear object 22 within the enclosure 12. The intermodulation signals can appear at frequencies $f_{pulse}+f_{nonlinear}$, and $f_{pulse}+f_{nonlinear}$, as well as other integer multiples, including $p*f_{pulse}+/-q*f_{nonlinear}$ where p and q are positive integers.

As shown in FIG. 1B, the full sona 40 detected at the receiving port 20 is band-pass filtered into a linear sona 42 through a band-pass filter 44 centered at the pulse carrier frequency $f_{pulse}$.

A separate band pass-filter 46 centered at one of the intermodulation frequencies, for example, $f_{pulse}+f_{nonlinear}$, or $f_{nonlinear}$ is applied to the full sona 40 to extract at least one nonlinear sona 48.

FIG. 6B is the inset in FIG. 6A showing a close up around the center frequency of the pulse and the intermodulation products that were created due to the interaction of the pulse with the nonlinear antenna. Further herein, the terminology "linear sona" and "nonlinear sona" is used to describe the signals that are obtained from the full sona using the bandpass filtering. The term "linear sona" is used to describe the portion of the full sona that was generated directly by the Linear Antenna (FIG. 2E), which does not have a non-linear element. On the other hand, the term "nonlinear sona" describes the portion of the full sona that resulted from the interaction of the pulse with the Nonlinear Antenna (FIG. 2D), which has the non-linear diode attached to it.

Figure 3A:
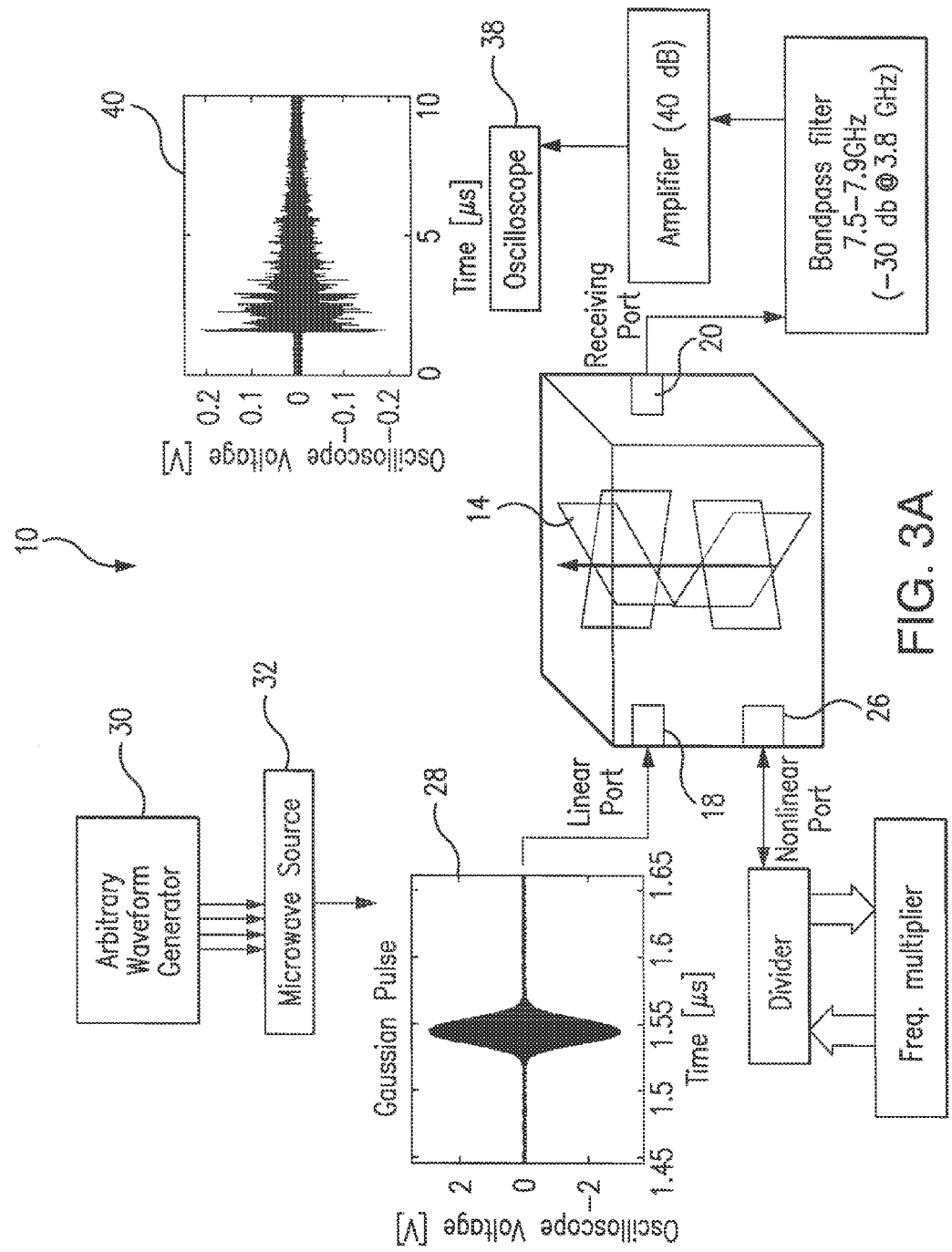
FIGS. 3A-3B are a more detailed schematic representation of the experimental setup, where
Figure 3B:
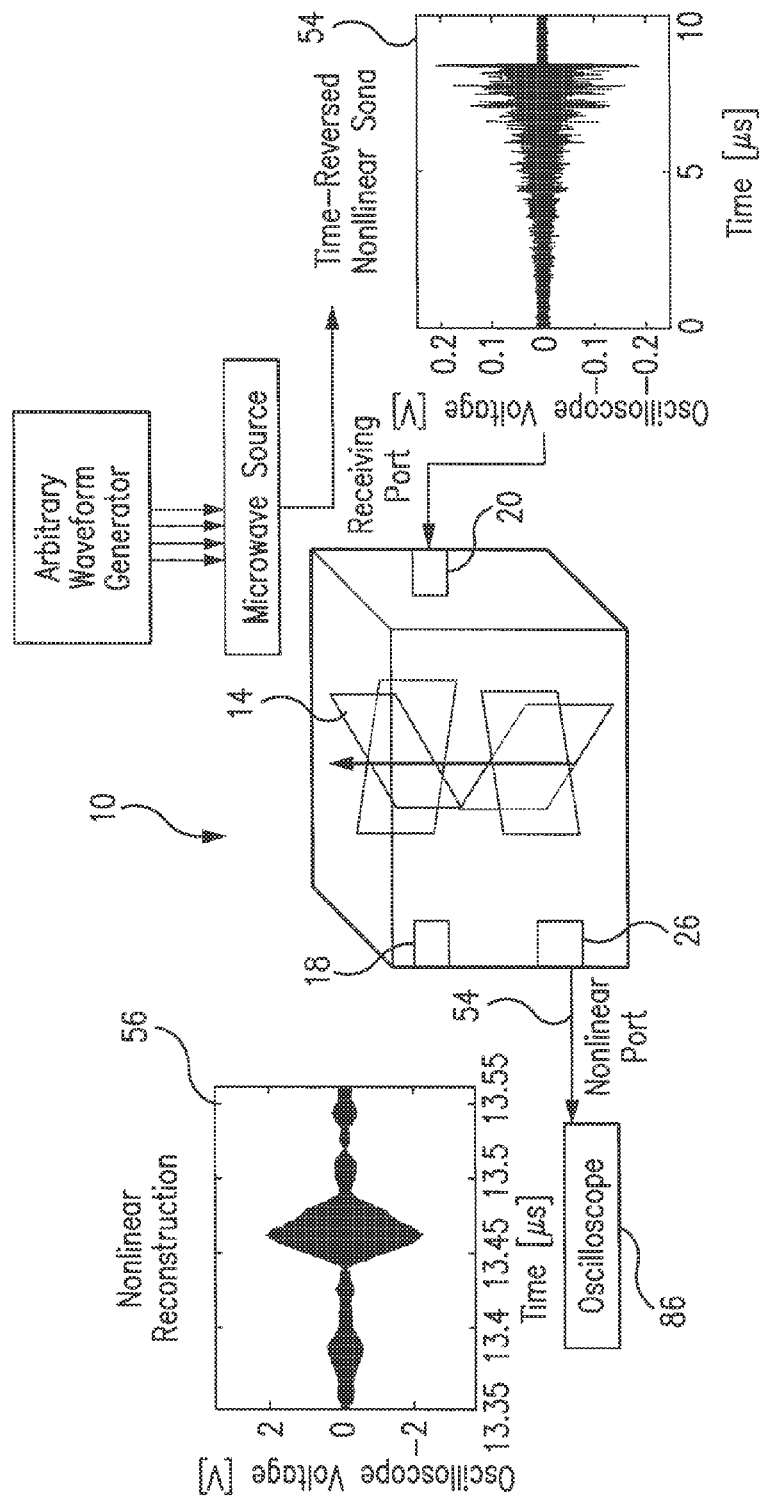

As shown in FIGS. 1B and 3B, the filtered sonas (e.g., the linear sona 42 and nonlinear sona 48) are time-reversed in the time-reversing units 68 and 70, respectively, and transmitted (using, for example, the AWG 30 and PSG 32) from the transmitter 66 at the receiving port 20 back into the enclosure through the receiving port 20.

The time-reversed linear sona 50 propagates through the enclosure 12, and reconstructs as a time-reversed replica 52 of the original pulse at the location of the linear port 18. The time-reversed nonlinear sona 54 also propagates through the environment, but reconstructs as a time-reversed replica 56 at the location of the nonlinear port 26, and not at the linear port 18.

An oscilloscope 88 may be coupled to any desired location in the system 10 to obtain a wave-form either of the linear sona, the nonlinear sona, or time-reversed signals, as well as time-reversed reconstructed signals (also referred to herein as replicas).

Figure 7A:
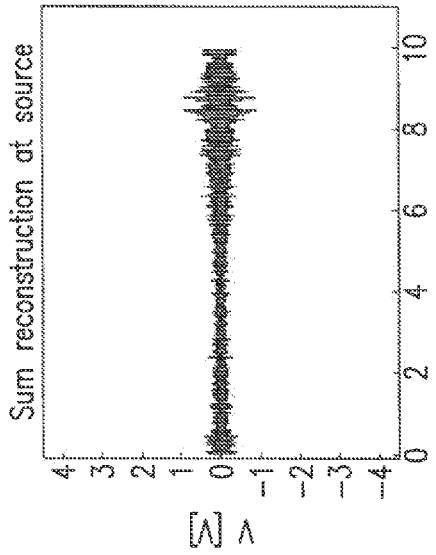
FIGS. 7A-7G are diagrams representing reconstructions collected at the linear port and at the nonlinear port, respectively, due to broadcast of time-reversed sonas from the receiving port.
Figure 7B:
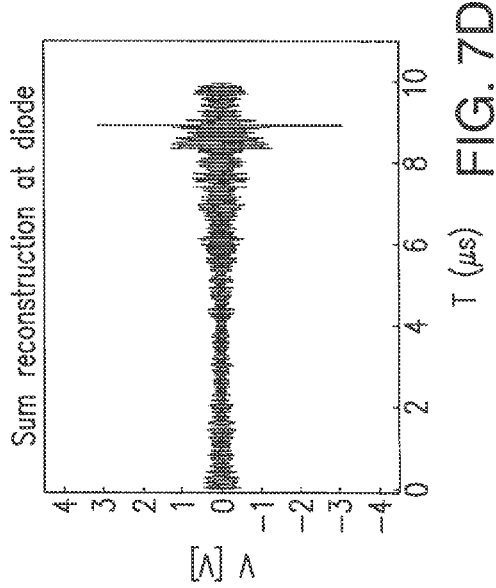
Figure 7C:
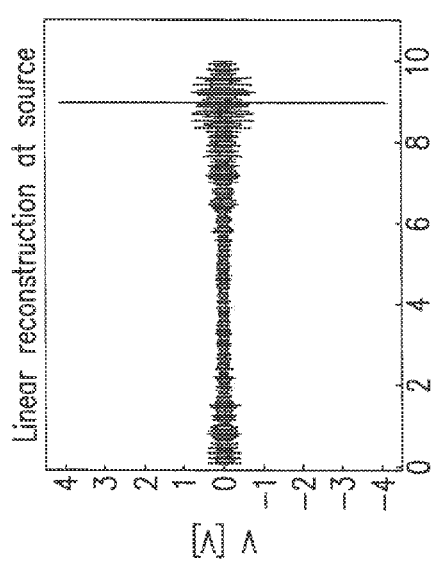
Figure 7D:
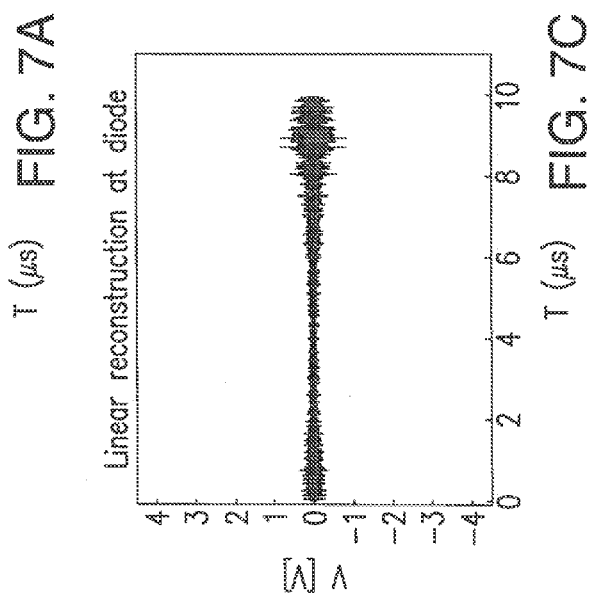
Figure 7E:
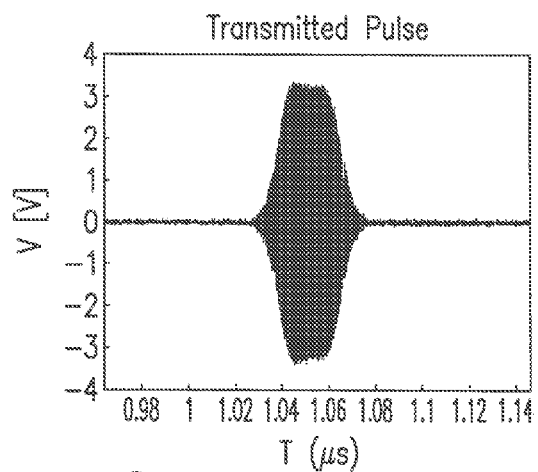
Figure 7F:
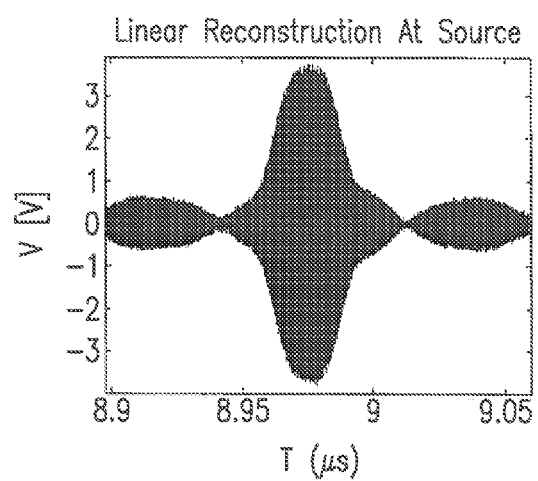
Figure 7G:
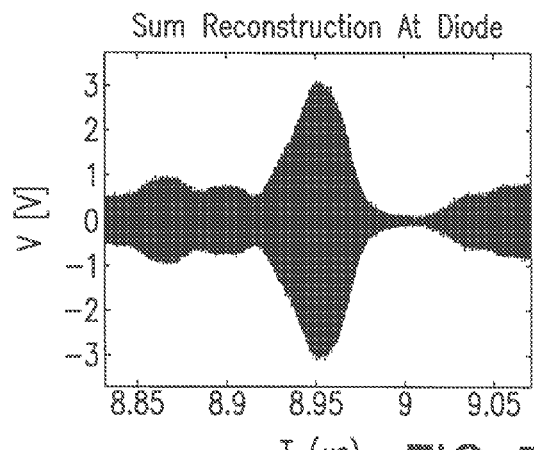

FIGS. 7A-7G show examples of reconstructed pulses (replicas) 52, and 56 measured at the linear port 18 and at the nonlinear port 26, respectively. FIG. 7A shows the reconstruction of the linear sona at the linear port. FIG. 7B shows the lack of reconstruction of the nonlinear signal at the linear port. FIG. 7C shows a lack of reconstruction of the linear signal at the nonlinear port. FIG. 7D shows reconstruction of the nonlinear signal at the nonlinear port. FIG. 7E shows the initially transmitted pulse. FIG. 7F shows the linear signal time-reversed reconstruction at the linear port, and FIG. 7G shows the nonlinear time-reversed reconstruction at the nonlinear port.

The linear sona 42 does not produce a reconstruction at the nonlinear port 26, and the nonlinear sona 48 does not create a reconstruction at the linear port 18. This is an example of the exclusive communication channel that has been established, as will be detailed infra.

The principles of the present invention may be used in coded communication supported by a processor unit 100 included in communication scheme. Shown in FIGS. 1A-1B, 3A-3B, and 14D-14E, the processor unit 100 is configured for various routines and computations necessary for the subject system operation, including processing of signals detected at the receiving port 20, the nonlinear port 26, and/or linear port 18. This may include filtering of the full sona to extract linear and nonlinear sonas, formation of a time-reversed signal, Fast Fourier transformation (FFT unit 72) and Inverse Fast Fourier transformation (IFFT unit 74), encoding of signals (Pulse Code Modulation Unit 80), encoding of images (Image encoding unit 76, Image decoding unit 78), decoding of signal detected at the linear and nonlinear ports (Reconstruction Decoding Unit 82), and other aspects of realization of the present system and its operation in a number of various applications. The processor unit 100 is also configured to output decoded reconstruction data (unit 88) in any format required by a user.

Figure 8:
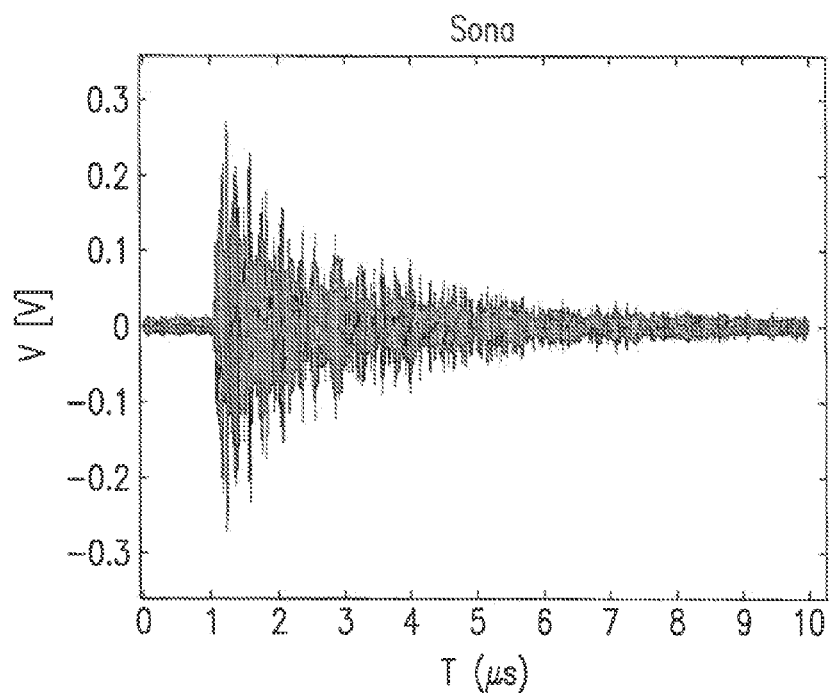
FIG. 8 is a diagram of the sona signal that is used to represent "1" bit.

The nonlinear sona received at the receiving port 20 may be utilized to create a '1' bit at the nonlinear object in the pulse code modulation communication scheme supported by the Pulse Code Modulation Unit 80. FIG. 8 shows an example of a '1 bit' sona.

Figure 9:
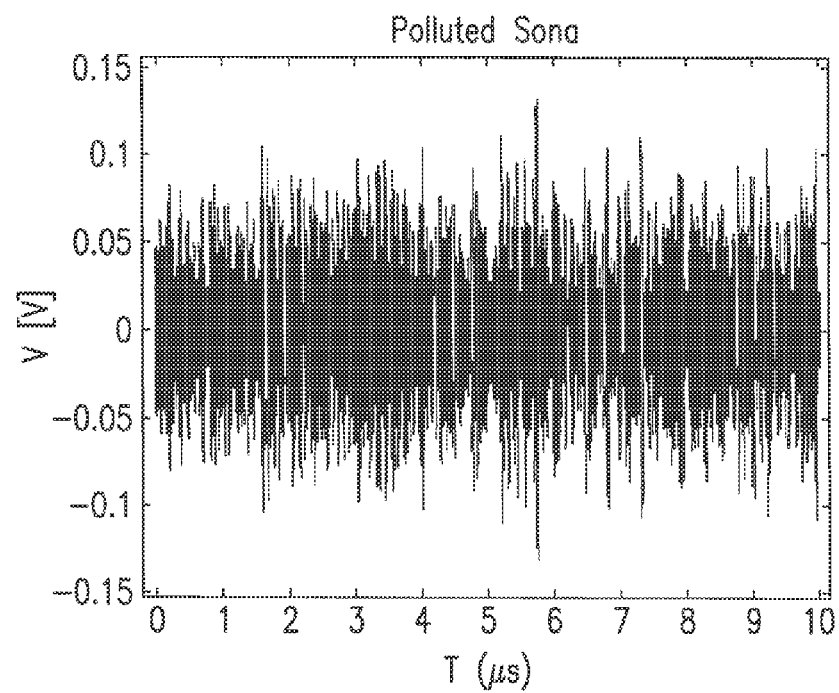
FIG. 9 is a diagram of the sona signal which is used to represent a "0" bit whose phase information has been corrupted with addition of Gaussian noise.

In order to create a '0' bit sona, the nonlinear sona is Fourier-transformed supported by the (FFT Unit 72) into the frequency domain, and random Gaussian noise is added to the phase information of this signal. This noisy-phase signal is inverse-Fourier transformed (supported by the IFFT Unit 74) back to the time domain, resulting in a '0' bit sona that superficially looks like the nonlinear sona, but does not cause a reconstruction anywhere when it is time-reversed. FIG. 9 shows an example of a '0 bit' sona.

A series of thus formed '1' and '0' time-reversed sonas are overlapped in a coded stream, and are transmitted from the transmitter 66 at the receiving port 20. The presence or absence of reconstructed pulses are detected at the nonlinear port 22, translated into the bit pattern in the pulse code modulation communication scheme, and is output from the Processor Unit 100 at the Decoded Reconstructed Data Port 88.

Figure 10A:
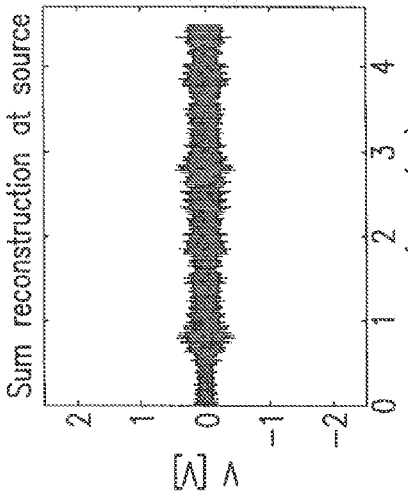
FIGS. 10A-10D are time-reversed reconstructions of multiple bit sonas collected at the linear port and at the nonlinear port, respectively.
Figure 10C:
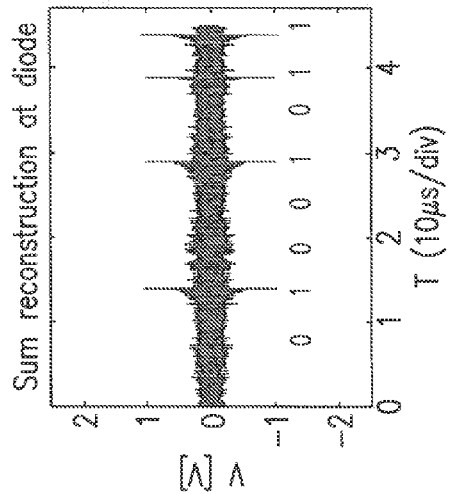
Figure 10B:
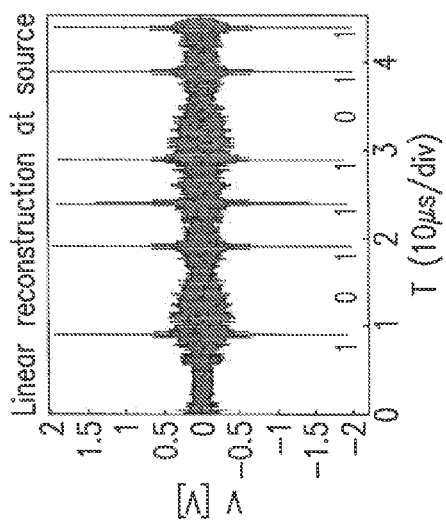
Figure 10D:
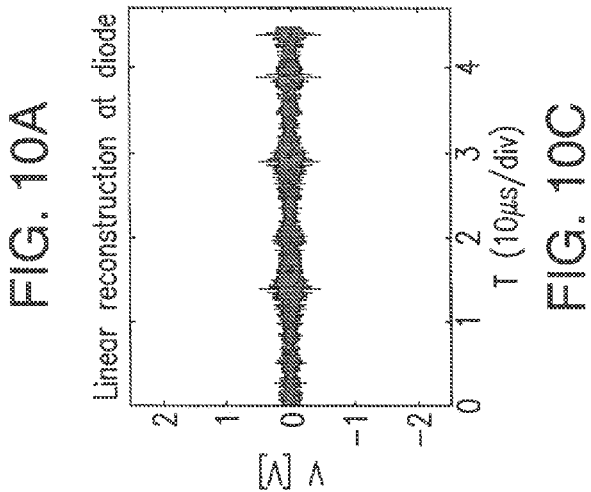

FIG. 10A shows the reconstruction of the linear signal at the linear port, reconstructing as the byte "10111011". FIG. 10B shows the lack of reconstruction of the nonlinear signal at the linear port. FIG. 10C shows a similar lack of reconstruction of the linear signal at the nonlinear port, and FIG. 10D shows reconstruction of the nonlinear signal at the nonlinear port, reconstructing as the byte "01001011".

As demonstrated in FIGS. 7A-7G and 10A-10D, reception of the nonlinear sona reverberations at other locations in the enclosure 12 will not give information about the bits transmitted to the nonlinear port.

The principles of the present invention may be used in image transmission to a desired location through an exclusive communication channel 102, best shown in FIG. 1B.

Once an exclusive communication is established through the linear and nonlinear sonas (as detailed supra), their effectiveness can be demonstrated by transmitting images from the receiving port 20 to either the linear port 18 or the nonlinear port 22. These images will not be received by the unintended port. FIGS. 11A-11F show two different images 60 and 62, both sent from the receiving port 20. As illustrated in FIG. 1B, the images 60, 62 are encoded by means of time-reversed pulse modulation supported by the Image Encoding Unit 76 in the processor unit 100, and are 'directed' (by means of either the linear sona or nonlinear sona) to either the linear port 18 or the nonlinear port 22.

Figure 11A:
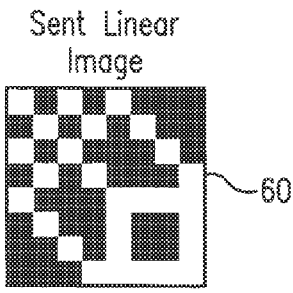
FIGS. 11A-11F show black-and-white bit-patterns transmitted to the linear port and the nonlinear port, respectively.
Figure 11B:
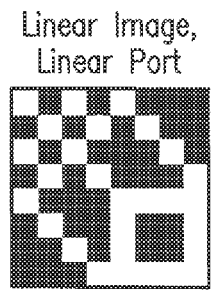
Figure 11C:
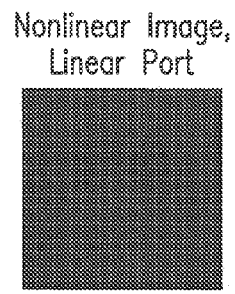
Figure 11D:
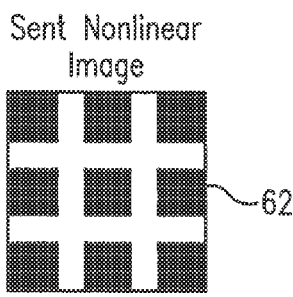
Figure 11E:
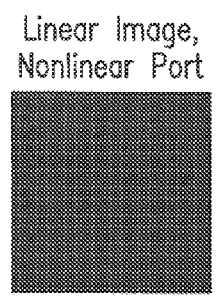
Figure 11F:
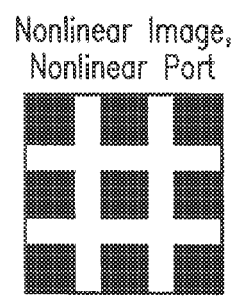

FIG. 11A is an image broadcast by the received port to be delivered to the linear port. FIG. 11B is an image in FIG. 11A which is properly delivered to the linear port. FIG. 11C is an image in FIG. 11A which could not be detected as a nonlinear port as it was intended. FIG. 11D is the image broadcast by the received port to be delivered to the nonlinear port. FIG. 11E is the image in FIG. 11D which cannot be detected at the linear port, and FIG. 11F is an image shown in FIG. 11D which could be detected at the nonlinear port as it was intended. The image 60 sent to the linear port 18 was correctly received, while the same image 60 did not appear at the nonlinear port 22. Likewise, the image 62 was sent to the nonlinear port 22 and successfully received thereat, whereas no information was received at the linear port 18.

Each of these images 60, 62 was broadcast using waves that reverberated throughout the enclosure 12, yet the information was only conveyed to specific locations, to the exclusion of all others.

Figure 12A:
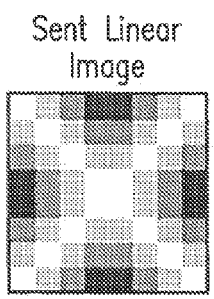
FIGS. 12A-12F represent grey scale patterns sent to the linear port and the nonlinear port, respectively.
Figure 12B:
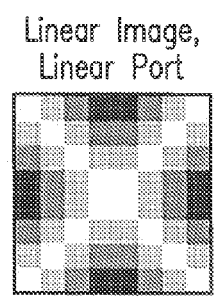
Figure 12C:
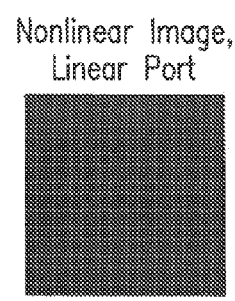
Figure 12D:
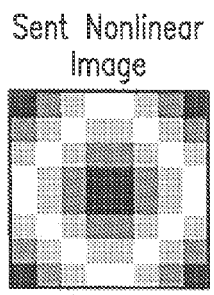
Figure 12E:
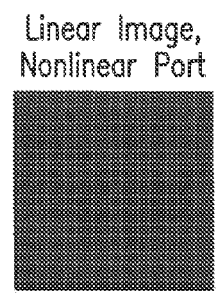
Figure 12F:
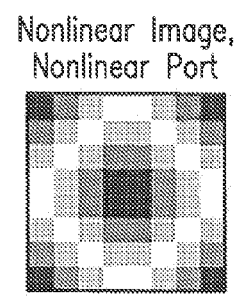

FIGS. 12A-12F and 13A-13F show another demonstration of the exclusive communication channels with gray-scale images. FIG. 12A is the image broadcast by the received port to be delivered to the linear port. FIG. 12B is the image and FIG. 12A which is properly delivered to the linear port. FIG. 12C is the image in FIG. 12A which could not be detected at the nonlinear port as it was intended. FIG. 12D is the image broadcast by the received port to be delivered to the nonlinear port. FIG. 12E is the image in FIG. 12D which could not be detected at the linear port, and FIG. 12F is the image shown in FIG. 12D which could be detected at the nonlinear port as it was intended.

Figure 13A:
FIGS. 13A-13F represent false color images (40px×40px) sent to the linear and the nonlinear ports, respectively.
Figure 13B:
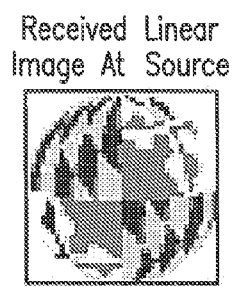
Figure 13C:
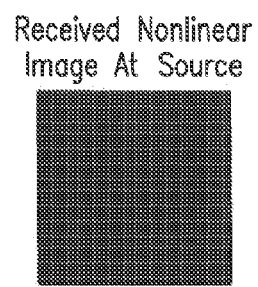
Figure 13D:
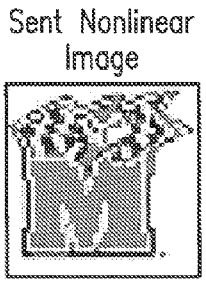
Figure 13E:
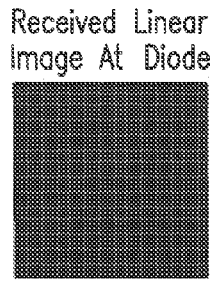
Figure 13F:
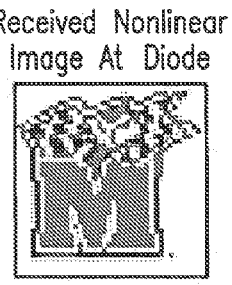

FIG. 13A is an image broadcast by the received port to be delivered to the linear port. FIG. 13B is the image in FIG. 13A which is properly delivered to the linear port. FIG. 13C is the image and FIG. 13A which could not be detected at the nonlinear port as it was intended. FIG. 13D is the image broadcast by the received port to be delivered to the nonlinear port but not to the linear port. FIG. 13E is the image in FIG. 13D which could not be detected at the linear port, and FIG. 13F is the image shown in FIG. 13D which could be detected in the nonlinear port as it was intended.

The exclusive nature of the reconstruction of the nonlinear sona allows the construction of a communication channel to the nonlinear port. FIGS. 14A-14E demonstrate such a communication channel in the experimental system using the passive harmonic-generating nonlinearity.

The communication channel operates by using a signal formed by shifting and superimposing a series of one-input-pulse sonas.

Figure 14A:
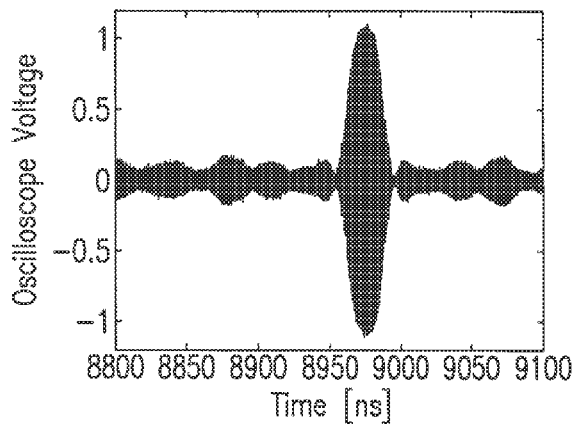
Figure 14B:
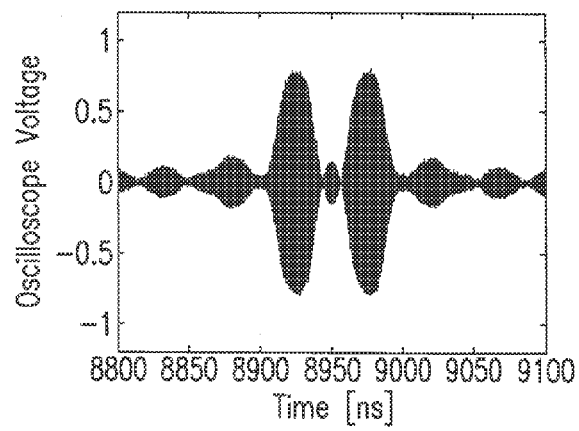
Figure 14C:
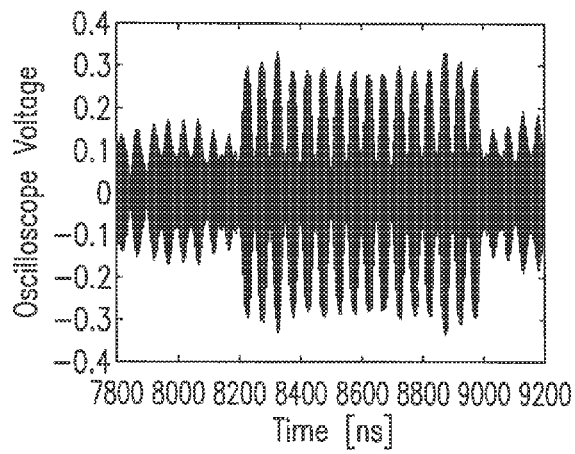

FIGS. 14A-14C demonstrate reconstructions of the overlapped sonas. When this superposition of sonas is time reversed and reinjected, it results in reconstruction of a sequence of pulses at the intended receiver. To maximize the data capacity it is desired to employ shifts that are relatively short, yet long enough that the reconstruction results in distinguishable pulses.

In FIG. 14A, a reconstruction from a single linear sona is shown for illustration. In FIG. 14B two sonas are overlapped, with a time delay of 50 ns (shifted one pulse duration). The two pulses are clearly resolved in the reconstruction, though they are of lower amplitude than in the single-pulse reconstruction in FIG. 14A. The combined sonas are transmitted at the same power as the single sona, which results in the energy division between the reconstructions. In FIG. 14C, 16 sonas are combined, each new sona shifted 50 ns from the previous one. The reconstructions are still distinguishable above the side lobes, which are somewhat enhanced.

To send binary coded information as a string of 1's and 0's, a transmitted time-reversed one-pulse sona is used to represent a "1" bit and a phase-scrambled version of the one-pulse sona is used to represent a "0" bit. The use of a phase-scrambled sona for a "0" (rather than no transmission at all for a "0") is advantageous in that an eavesdropper, at another location, would not be able to distinguish 0's from 1's.

FIGS. 14D and 14E represent images of "LI" and "NL" images encoded using the linear sona (FIG. 14D) and nonlinear sona (FIG. 14E), transmitted exclusively to the linear and nonlinear ports in the experimental setup, respectively, and show images transmitted using reconstructions of concatenated sonas. Each pixel color is encoded in the Image Encoding Unit 76 of the Processor unit 100 as a two-bit word (black="00," blue="01," red="10," green="11") in a sona overlapped by 50% (a time delay of 5 The "LI" image in FIG. 14D was encoded using the filtered linear sona and transmitted from the receiving port.

The reconstructions at the linear port were decoded by the Image Decoding Unit 78 of the Processor unit 100 into pixels of the appropriate color, generating a facsimile of the original image which may be output through the port 88 of the Processor unit 100. At the nonlinear port, no reconstruction arrived, and the decoded wave form (a series of "00" words) decoded by the Image Decoding Unit 78 of the Processor unit 100 as a black image. The "NL" image shown in FIG. 14E was encoded by the processor unit 100 using the filtered nonlinear sona and transmitted in the same manner from the receiving port. For the NL image, the reconstructions arrive at the nonlinear port, and are decoded by the processor unit 100 as the facsimile image and output through the Port 88 of the Processor unit 100. At the linear port, the lack of reconstructions results in a mostly black image.

A Model for Nonlinear Time Reversal

A. Linear Model

Figure 15:
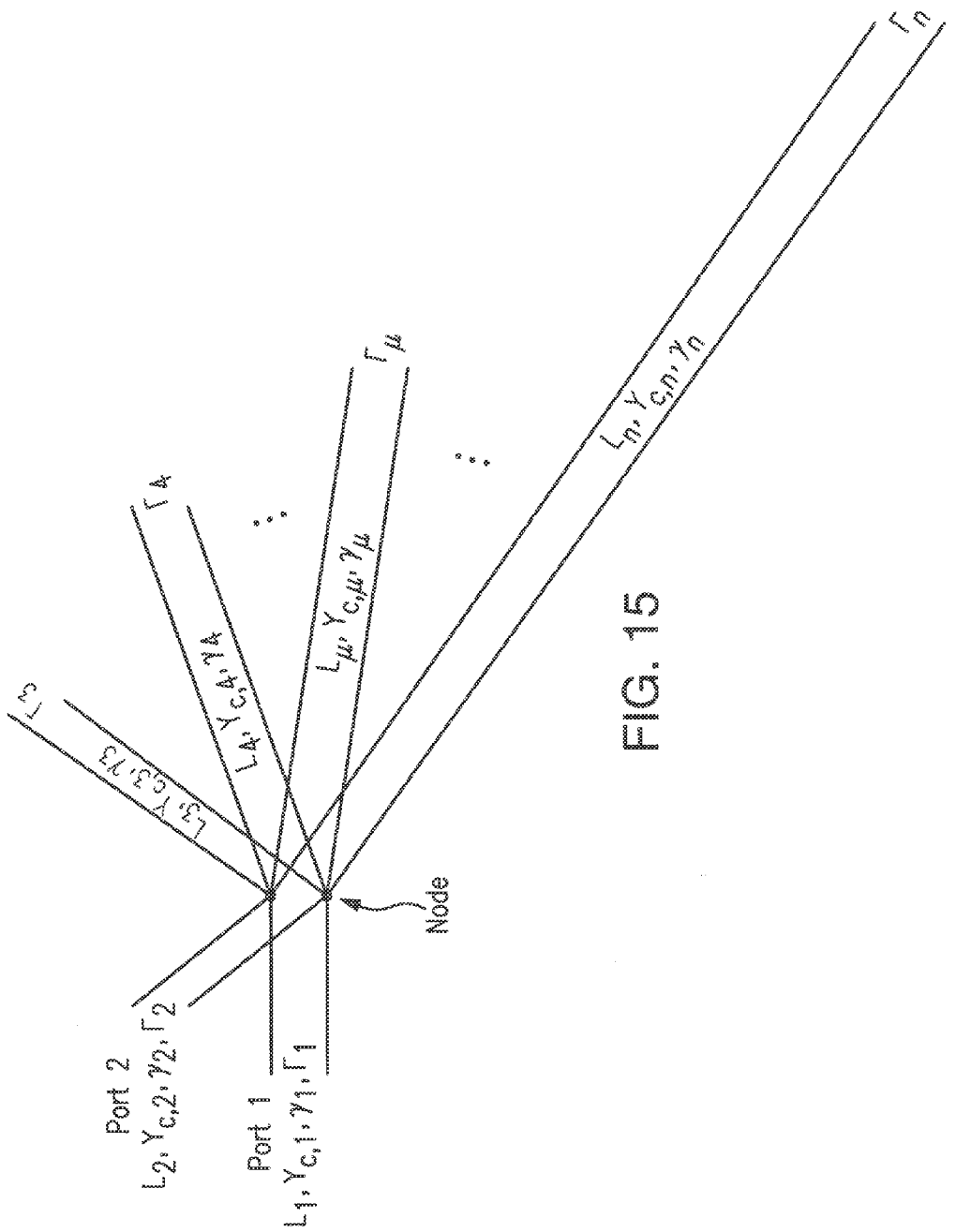
FIG. 15 is a representation of the model network of transmission lines connected in a star-graph topology.

The model of a cavity with two ports is constructed as a network of transmission lines of varying lengths, connected in a star-graph topology, as shown in FIG. 15. The use of multiple-connected transmission lines to simulate complex wave-chaotic scattering systems is well established. Wave propagation on a network of interconnected transmission lines becomes quite complex, even for a simple graph. The computational simplicity of these quasi-one-dimensional models is advantageous. Each pair of lines in FIG. 15 depicts a linear homogeneous transmission line, representing a portion of a channel of wave propagation in the cavity.

Each line $\mu$ is assigned a length $L_\mu$ (and a corresponding time for a wave packet to transit $\Delta t_\mu$, a characteristic admittance $Y_{c,\mu}$, attenuation ($\alpha_\mu$), and phase evolution ($\beta_\mu = \omega/v_\mu$) per unit length [with combined propagation constant $\gamma_\mu(\omega) = \alpha_\mu + i\beta_\mu$], and a complex reflectivity $\Gamma_\mu$ for the termination of the unconnected end. Lines 1 and 2 are designated to represent the two ports into the cavity by selecting $\Gamma_1 = \Gamma_2 = 0$. Waves exiting the graph through the two ports are not reflected.

The other lines $\mu > 2$, through the multiple reflections and scattering at the common node, simulate the presence of multiple ray paths connecting Ports 1 and 2. In what follows, the case $\Gamma_\mu = 1$ (open circuit) is considered for $\mu > 2$. In previous models [B. T. Taddese, et al., Electron. Lett. 47, 1165 (2011); and B. T. Taddese, et al., New J. Phys. 15, 023025 (2013)] only a single port is used to transmit and receive wave forms. A wave form is "injected" into the system at one port, and the resulting wave form is "received" and recorded at the other port.

The linear transmission line networks are analytically solvable in both the frequency domain and in the time domain. In the frequency domain, a sona is generated by applying the scattering matrix to an initial Gaussian pulse. For a two-port star network of transmission lines, the scattering parameters can be expressed in terms of the input admittance [$Y(\omega)$] of the (nonport) lines and the characteristic impedances of the ports ($Z_{c,\mu} \equiv 1/Y_{c,\mu}$) by $$Y(\omega) = \sum_{\mu=3}^{n} Y_{c,\mu} \left( \frac{1 - \Gamma_\mu e^{-2\gamma_\mu L_\mu}}{1 + \Gamma_\mu e^{-2\gamma_\mu L_\mu}} \right), \quad (1a)$$

$$S_{11}(\omega) = \frac{Z_{c,2} - Z_{c,1} - Y(\omega) Z_{c,1} Z_{c,2}}{Z_{c,1} + Z_{c,2} + Y(\omega) Z_{c,1} Z_{c,2}} e^{-2\gamma_1 L_1}, \quad (1b)$$

-continued $$S_{12}(\omega) = \frac{2\sqrt{Z_{c,1}Z_{c,2}}}{Z_{c,1} + Z_{c,2} + Y(\omega)Z_{c,1}Z_{c,2}} e^{-\gamma_1 L_1 - \gamma_2 L_2}, \quad (1c)$$

$$S_{21}(\omega) = S_{12}(\omega), \quad (1d)$$

$$S_{22}(\omega) = \frac{Z_{c,1} - Z_{c,2} - Y(\omega)Z_{c,1}Z_{c,2}}{Z_{c,1} + Z_{c,2} + Y(\omega)Z_{c,1}Z_{c,2}} e^{-2\gamma_2 L_2}. \quad (1e)$$

where n is the total number of lines. Port 1 is chosen to be perfectly matched (i.e., no prompt reflection for signals injected into this port) by requiring $$Y_{c,1} = \sum_{\mu=2}^{n} Y_{c,\mu} = Y_{c,2} + \sum_{\mu=3}^{n} Y_{c,\mu}. \quad (2)$$

From Eq. (2) it is not possible to simultaneously match both Port 1 and Port 2 [S. Hemmady, et al., Phys. Rev. Lett. 94, 014102 (2005); S. Hemmady, et al., IEEE Trans. Electromag. Compat. 54, 758 (2012)]. In what follows, $Y_{c,2} = Y_{c,1}/2$ is chosen for which there is a prompt reflection coefficient of 1/3 at Port 2.

In the time-domain model, a wave form is "injected" from one port into the network. At a particular time t, the voltages in the network are described by the following system of equations. The voltage $V_N(t)$ at the node connecting the transmission lines in parallel is given by $$V_N(t) = (V_{\mu,+} + V_{\mu,-}) \quad (3)$$

for all $\mu$ where $V_{\mu,+}$ represents the voltage of the incoming wave along line $\mu$ at the node, and $V_{\mu,-}$ the voltage of the outgoing wave. The current entering the node contributed by line $\mu$ is $$I_\mu(t) = Y_{c,\mu}[V_{\mu,+} - V_{\mu,-}]. \quad (4)$$

Summing over all n lines in the network, $$\sum_{\mu=1}^{n} I_\mu(t) = 0, \quad (5)$$

as required by Kirchoff's current law. Finally, the voltage for a wave reflected from a line end and incoming to the node is given by $$V_{\mu,+}(t) = e^{-2\alpha_\mu L_\mu} V_{\mu,-}(t - 2\Delta t_\mu), \quad (6)$$

where $e^{-2\alpha_\mu L_\mu}$ accounts for the attenuation, and the reflection coefficient at the end of the line is taken to be $\Gamma_\mu = 1$ ($\mu > 2$), and the attenuation $\alpha_\mu$ has been approximated as being constant over the bandwidth of the signal.

Using Eq. (3) to express $V_{\mu,-}$ in Eq. (4) and substituting in Eq. (5) determines the node voltage $V_N$ in terms of the incoming voltages $V_{\mu,+}$, $$V_N(t) = 2 \frac{\sum_{\mu=1}^{n} Y_{c,\mu} V_{\mu,+}}{\sum_{\mu=1}^{n} Y_{c,\mu}}. \quad (7)$$

A sona is calculated from the initial Gaussian pulse, propagated from the broadcasting port (port 1) as $V_{1,+}(t)$, by discretizing time, expressing $V_{\mu,-} = V_N - V_{\mu,+}$, and using Eq. (6) to update $V_{\mu,+}$. Once $V_N(t)$ is known, the wave form arriving at the receiving port can be recorded. In the time-reversed direction, the transmitting and receiving ports are swapped, and time-reversed sona is propagated from the new transmitting port, creating a reconstruction at the new receiving port.

FIGS. 16A-16F show the sonas and reconstructions generated by the described model (FIGS. 16A-16C) and the linear time-reversal experiment (FIGS. 16D-16F), for comparison.

Figure 16A:
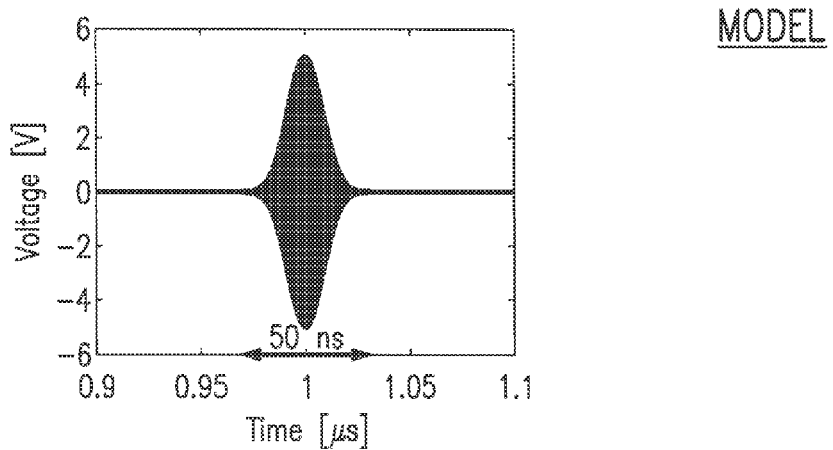
FIG. 16A-16C are diagrams representing time domain signals in the linear two-port star graph with N=10 lines.
Figure 16B:
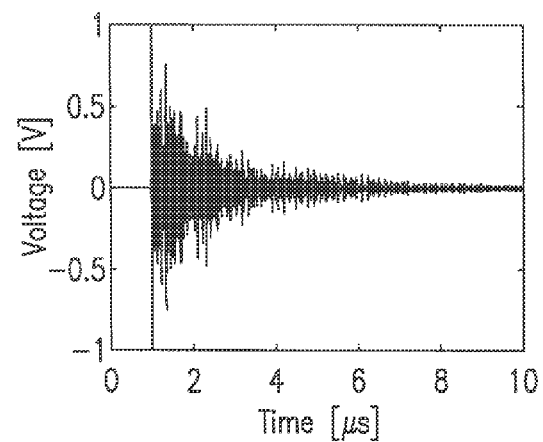
Figure 16C:
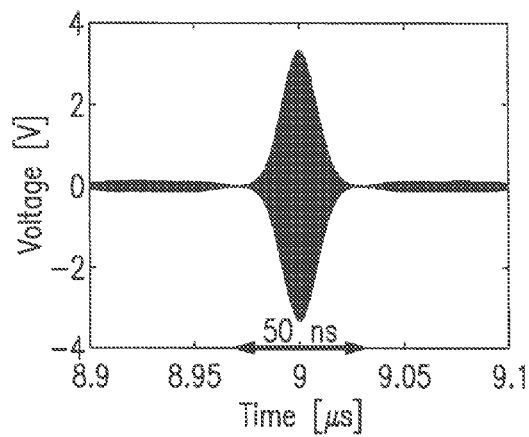
Figure 16D:
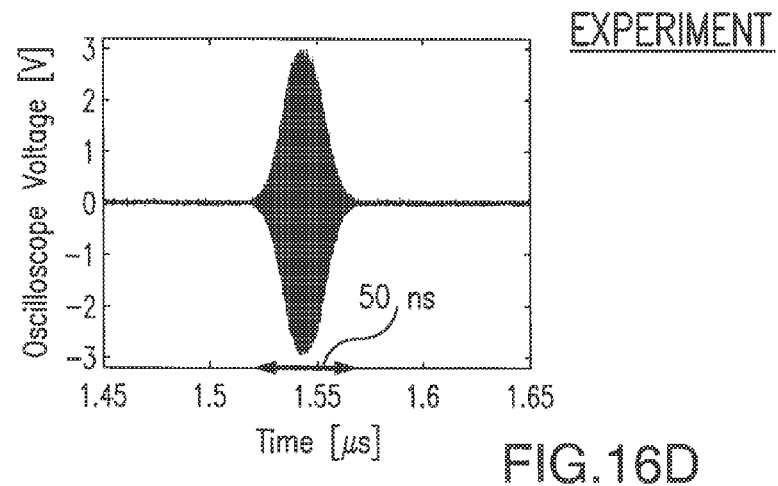
FIG. 16D-16F are corresponding measured time-domain signals from the subject system, showing the input pulse, the sona signal, and a time-reversed reconstruction.
Figure 16E:
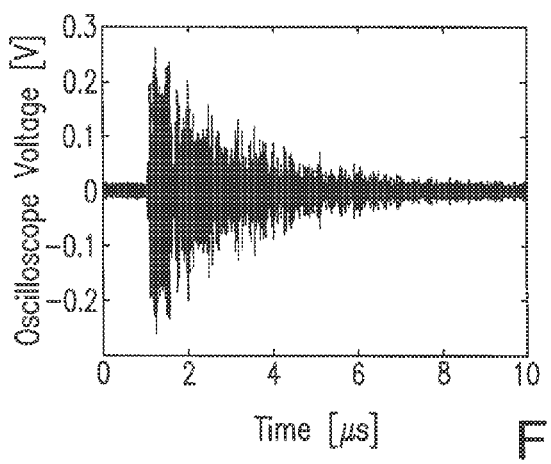
Figure 16F:
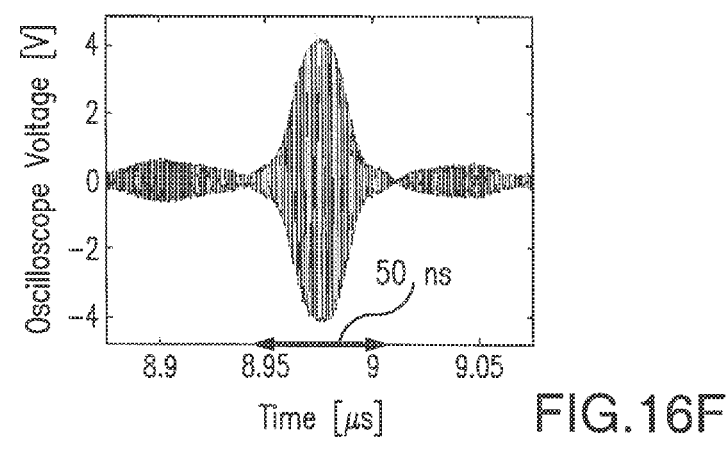

FIG. 16A is a diagram of an initial Gaussian pulse applied to port 1. FIG. 16B is a diagram representing a resultant sona collected at port 2. FIG. 16C is a diagram representing reconstruction at port 1 from linear time reversal of sona in FIG. 16B generated in the model. FIGS. 16D-16F are diagrams representing experimental results obtained in the linear resident cavity. FIG. 16D is a diagram representing initial Gaussian pulse applied to the transmitting port. FIG. 16E is a diagram representing resultant sona collected at the receiving port, and FIG. 16F is a diagram representing reconstruction of the time-reverse sona in FIG. 16E recorded at the original transmitting port.

The sona in FIG. 16B was generated by propagating the Gaussian pulse with carrier frequency $f_0 = 3.8$ GHz shown in FIG. 16A through a transmission line network from Port 1 to Port 2. The network was constructed from ten line segments of lengths (1, 1, 4, 6, 10, 16, 25, 40, 60, 100 m), with no loss ($\alpha_\mu = 0$), and open circuited ends ($\Gamma_\mu = 1$) for the nonport lines. The characteristic admittances are $Y_{c,\mu} = 0.02$ S for lines 3-10, $Y_{c,2} = 0.16$ S, and $Y_{c,1} = 0.32$ S [Eq. (2)]. The decay of the sona signal in FIG. 16B is due to power leakage out through Ports 1 and 2. The reconstruction at Port 1 shown in FIG. 16C was generated by propagating the time reversal of the sona into the network from Port 2.

In the experiment, the Gaussian pulse at a carrier frequency $f_0 = 3.8$ GHz shown in FIG. 16D was transmitted into the three-dimensional linear cavity at the transmitting port, generating the sona (FIG. 16E) recorded at the receiving port. The time-reversed sona was retransmitted into the cavity at the receiving port, reconstructing the wave form shown in FIG. 16F at the transmitting port. The model closely approximates the real time-reversal mirror, as shown by the sidelobes ($t \leq 8.975$ μs, $t \geq 9.025$ μs) in the reconstruction in FIG. 16C, which are similar to those seen in FIG. 16F. The model sidelobes result since perfect time reversal is not achieved due to the fact that the time-forward reflected signal propagating backward in line 1 is not recorded, reversed, and reinjected. Also, a portion of the sona signal is lost due to the finite recording time in the timeforward step, further degrading the reconstruction. In addition to these mechanisms, the sidelobes in the system arise from attenuation of the signals as they propagate.

B. Diode Model

The nonlinear element placed in the experimental cavity is modeled as a diode-terminating one transmission line, with incoming wave forms reflecting off the termination. The diode introduces harmonics to the reflected wave form and does not model any particular diode in detail. The model also lacks a time-delay or history-dependent mechanism. There is no "memory" of previous states, as in more sophisticated diode models. [R. Martz de Moraes, et al., Phys. Rev. E 58, 026201 (2003); IEEE Trans. Circuits Syst. I 51, 748 (2004)]. In terms of the incoming and outgoing voltages, the voltage across and current through the diode are given by $$V_d = V_+ + V_-, \quad (8)$$

$$I_d = Y_c[V_+ - V_-], \quad (9)$$

where $Y_c$ is the characteristic admittance of the transmission line connected to the diode. The current through the diode is also expressed in terms of the diode voltage by the ideal diode equation:

$$I_d = I_s \left( \exp \frac{V_d}{V_T} - 1 \right), \tag{10}$$

where $I_s$ is the saturation current of the diode, and $V_T = kT/e$ the thermal voltage. Solving this system of equations for $V_-$ in terms of $V_+$ (and defining $$\left( \text{and defining } f \equiv \frac{I_s}{Y_c V_T} \right)$$

gives $$V_- = V_+ + \frac{I_s}{Y_c} - V_T W \left( f e^{2\frac{V_+}{V_T} + f} \right), \tag{11}$$

where $W(z)$ is the Lambert W function, defined as the inverse of $z = We^W$.

Figure 17:
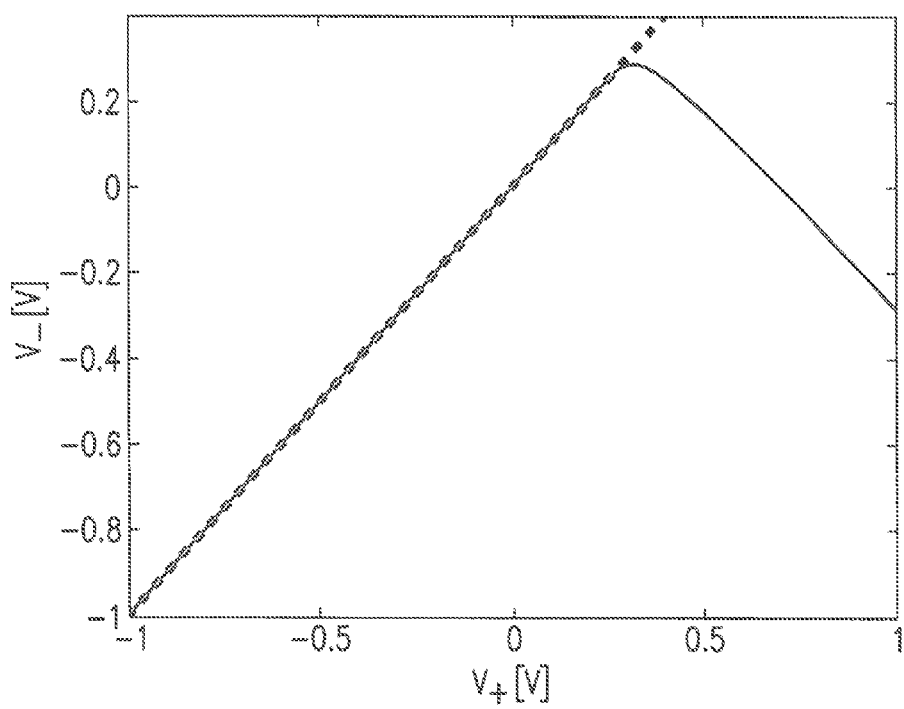
FIG. 17 is a plot of Eq. 11 mapping the incoming voltage V+ to the outgoing voltage V− after reflection from the model diode.

Eq. (11) is plotted in FIG. 17, using $I_s = 1 \times 10^{-12}$ A, $Y_c = 0.02$ S, and $V_T = 0.030$ V. The map between the incoming voltage $V_+$ and the outgoing voltage $V_-$ is similar to an offset tent map [L. Illing, et al., Chaos 16, 033119 (2006)]. An important feature of the offset tent map is the small-voltage linearity. For large (positive) incoming voltages, the diode is strongly nonlinear, but for negative, or small positive incoming voltages, the diode is essentially linear.

To validate the model diode, a simple situation is considered in which a Gaussian pulse of a microwave signal is reflected from a diode terminating a single transmission line.

Figure 18A:
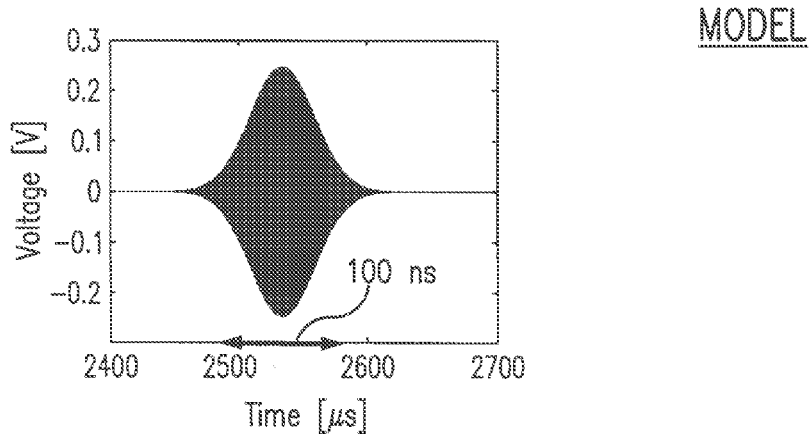
FIGS. 18A-18F are diagrams representing reflected signals for model and experiment, respectively.
Figure 18B:
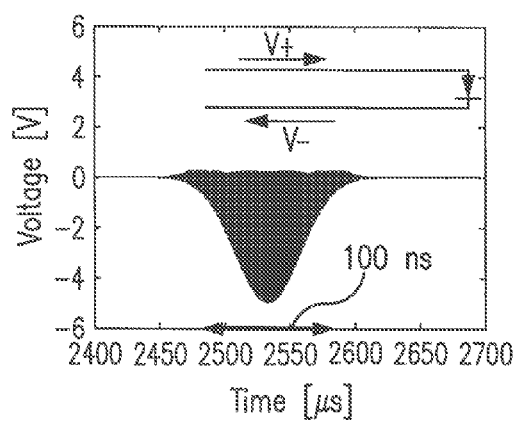
Figure 18C:
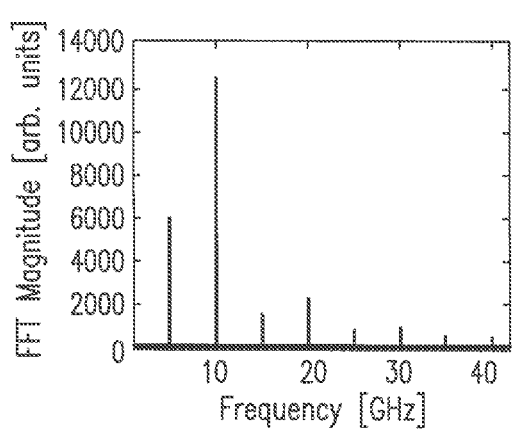
Figure 18D:
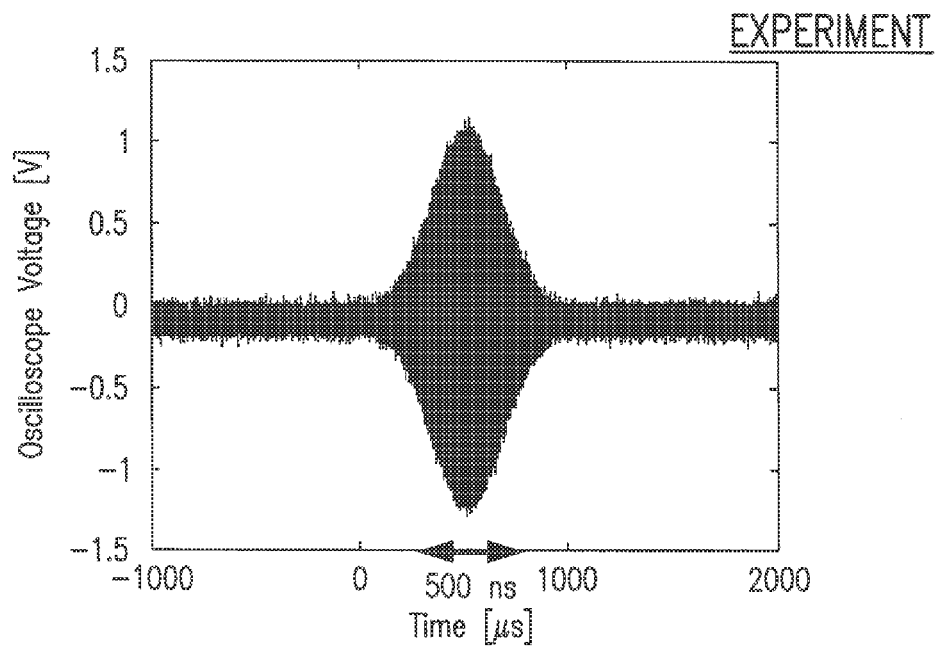
Figure 18E:
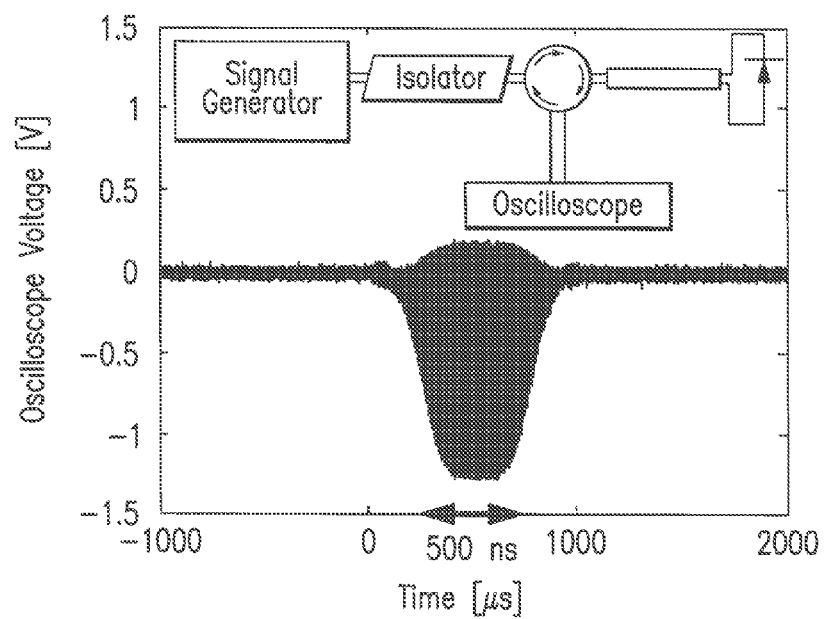
Figure 18F:
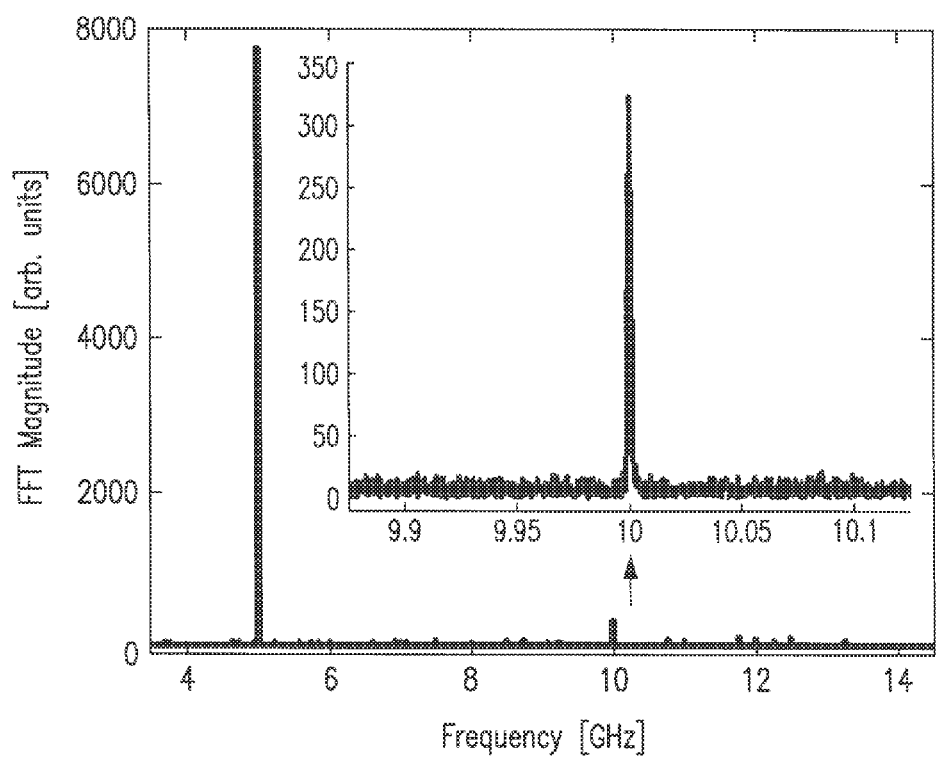

FIG. 18A is a diagram representing a low amplitude Gaussian pulse reflected from the model diode. FIG. 18B is a diagram representing a high amplitude Gaussian pulse reflected from the model diode, where the inset shows the schematic of the model for generating the pulse reflections in FIGS. 18A-18C. FIG. 18C is an FFT of the waveform shown in FIG. 18B. FIG. 18D is a low power Gaussian pulse reflected from a diode in a single-transmission-line experiment. FIG. 18E is a high power Gaussian pulse reflected from a diode in the system, where the inset shows the experimental setup for generating the pulse reflections in FIGS. 18D-18F. FIG. 18F is an FFT of the pulse shown in FIG. 18E, where the inset shows a magnified view of the second harmonic frequency;

In FIGS. 18A and 18B, a Gaussian wave form at a carrier frequency $f_0 = 5$ GHz is propagated along a single semi-infinite transmission line terminated in a model diode (as described above), as shown in the inset of FIG. 18B. For the low-amplitude (0.25 V) pulse in FIG. 18A, the model diode acts as an essentially linear termination, and no nonlinear effect is seen on the reflected pulses. In FIG. 18B a high-amplitude (5 V) pulse is strongly rectified, creating the reflected pulse shown. The FFT of the rectified pulse is shown in FIG. 18C, showing several harmonics of the initial signal.

A test was conducted simulating the model transmission line with a coaxial cable terminated by a microwave diode (model 1N4148), and driven by Gaussian pulses from a signal generator, as shown in the inset of FIG. 18E. Reflections of low-power pulses (−35 dBm) shown in FIG. 18E are unaffected, while the reflections of high-power (10 dBm) in FIG. 18D are strongly rectified. In FIG. 18F the FFT of the rectified pulse is taken. The inset shows the second harmonic component of the signal. This demonstrates that the diode nonlinearity can be turned "on" or "off" simply by controlling the amplitude of the signal reaching the nonlinear element. It also demonstrates that the model has the essential property of harmonic generation. The operation of the nonlinear time-reversed mirror depends only on this generic property, and not on any details of the nonlinear mechanism.

C. Full Nonlinear Model

The nonlinear model of a wave chaotic system is constructed by adding the diode terminating a transmission line to the longest leg of a linear star-graph network of transmission lines. The network was constructed from 10 line segments of approximate lengths (1, 1, 7.07, 8.66, 11.18, 13.23, 16.58, 18.03, 20.61, 21.79 m), with no loss ($\alpha_\mu = 0$), and perfectly reflecting ends ($\Gamma_\mu = 1$) for the nonport and nondiode lines. The characteristic admittances were chosen to be $Y_{c,\mu} = 0.02$ S for lines 3-10, $Y_{c,2} = \Sigma_{\mu=3}'' Y_{c,\mu}$, and $Y_{c,1} = \Sigma_{\mu=2}'' Y_{c,\mu}$. Port 1 models the linear port of the system, while port 2 models the receiving port. In the time-forward computation, a Gaussian wave form at a fixed carrier frequency $f_0 = 5$ GHz is propagated from port 1 into the network, portions propagating along each transmission line (including to the diode). The voltage waves leave the node and propagate down the transmission line to the terminations.

For the linear transmission lines, the returning voltage is calculated as a simple reflection, using Eq. (6). For the nonlinear line, the outgoing voltage is mapped to the returning voltage via Eq. (11). Upon returning to the node, the voltage is redistributed among the transmission lines. Voltage waves incident on port 1 are absorbed; voltages incident on port 2 are recorded as a sona signal and absorbed. The sona signal contains a linear component (at the original carrier frequency) and a nonlinear component arising from the diode, at several harmonics of the original carrier frequency.

In the time-reversed computation, the recorded sona signal is bandpass filtered into a linear sona, consisting of only frequencies near $f_0$, and a nonlinear sona, consisting of frequencies near $2f_0$. Separately, the complete sona and each filtered component are time-reversed and propagated into the network (with the diode replaced with a linear reflection) from port 2, and the reconstructions at port 1 and at the diode location are recorded.

Figure 19B:
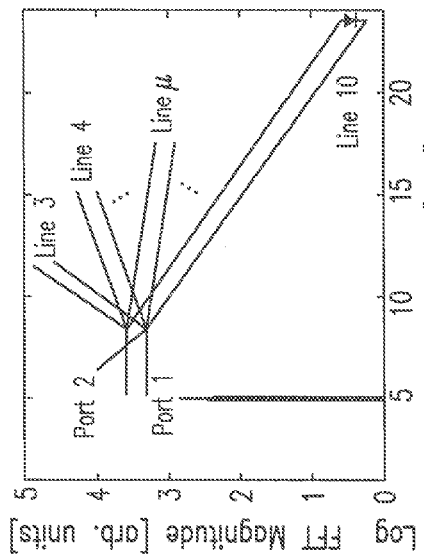
FIGS. 19A-19H are diagrams representing waveforms generated by the nonlinear time-reversal star-graph model.
Figure 19D:
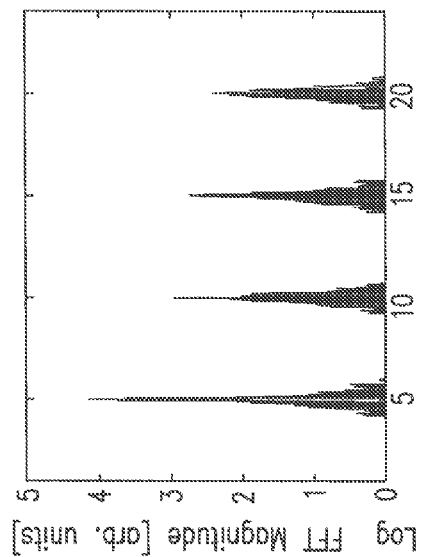
Figure 19A:
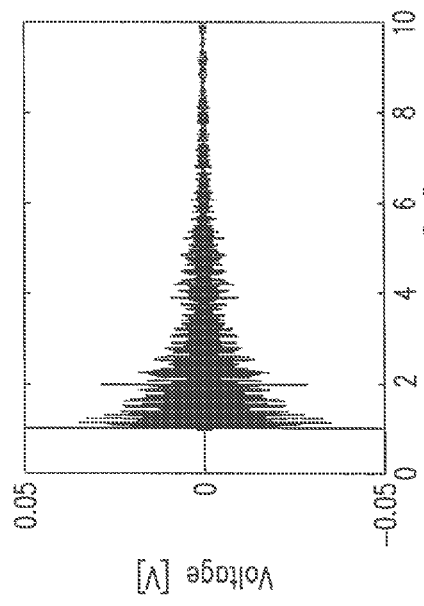

FIG. 19A is a diagram representing the sona generated by a low amplitude Gaussian pulse inserted in port 1, recorded at port 2. Specifically, FIG. 19A shows the sona generated at port 2 from a low-amplitude, 50 ns Gaussian pulse (0.25 V) at a carrier frequency of 5 GHz.

FIG. 19B is a frequency spectrum of the sona in FIG. 19A demonstrating the linearity of the network for the low-amplitude pulse, where the inset shows a diagram of the star-graph network, with a diode terminating the longest line (10). The Fourier transform of the sona as presented in FIG. 19B, shows the lack of harmonics generated by the diode.

Figure 19C:
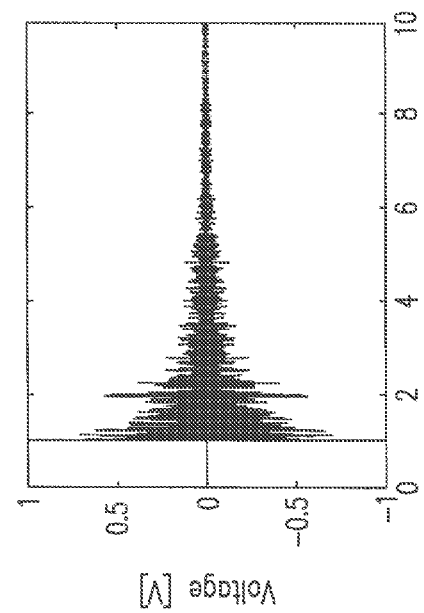

FIG. 19C is sona generated by a high-amplitude 5 ns Gaussian pulse (5V) injected at port 1, recorded at port 2. FIG. 19D is the frequency spectrum of the sona in FIG. 19C, with harmonics of the initial pulse frequency generated by interaction of the model diode. FIG. 19E represents a reconstruction of the fulltime-reverse sona in FIG. 19C measured at port 1, compared to the initial Gaussian pulse.

In FIG. 19E the entire (unfiltered) high-amplitude sona signal is time-reversed and retransmitted at Port 2, reconstructing at Port 1. This reconstruction is overlapped with the time-reversed original Gaussian wave form showing both a smaller amplitude (from perturbation of the system and loss through the ports) and slight rectification due to the nonlinear components of the sona.

Figure 19F:
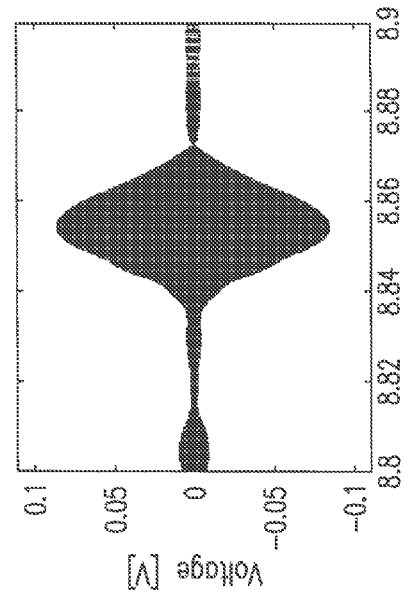
Figure 19H:
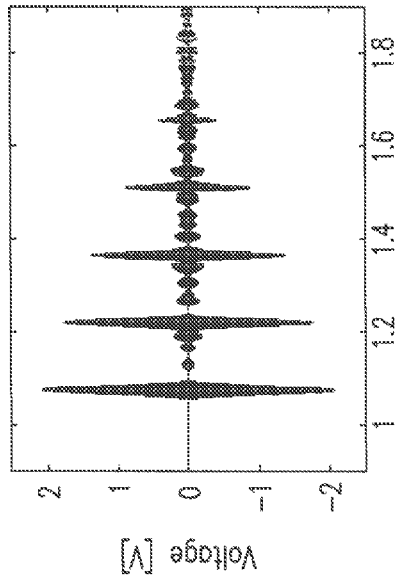
Figure 19E:
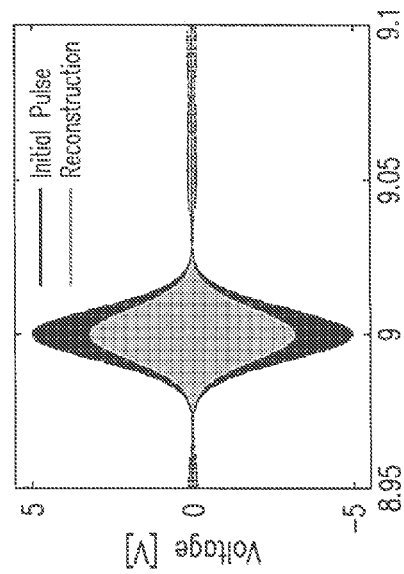
Figure 19G:
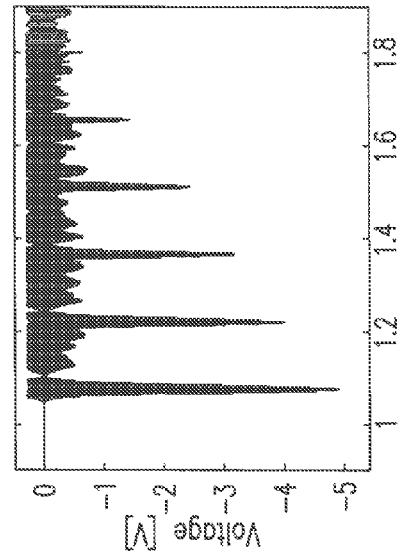

FIG. 19F is the representation of the reconstruction of the time-reversed nonlinear sona (filtered to select second harmonic) measured at the diode location (with the diode removed), FIG. 19G is a representation of the waveform reflected from diode back into the network after the initial excitation, and FIG. 19H is a representation of the waveform reflected from diode back into the network after the initial excitation, filtered to select the second harmonic.

FIG. 19F shows the reconstruction of the filtered nonlinear sona, measured at the original diode location. This reconstruction occurs at a location in time corresponding to the ballistic propagation distance between the diode and port 1. In FIG. 19G, the full frequency spectrum wave form initially incident upon and reflected from the diode (measured at the diode) is shown, while in FIG. 19H the filtered, second-harmonic component of the wave form in FIG. 19G is plotted. The strong rectified pulses in FIG. 19G (and the corresponding pulses in FIG. 19H) represent an initial excitation propagating between the diode and the graph node. This initial excitation occurs at a time delay corresponding to the ballistic propagation distance between Port 1 and the diode, with subsequent pulses delayed by the round-trip length of the line loaded with the diode. The secondary pulses result from an artifact of the model, in which the strong pulse is briefly trapped on the diode-loaded transmission line. Smaller pulses in between these reflected pulses represent signals arriving from other lines in the network, and are weakly rectified compared to the initial ballistic pulse. These results are consistent with the interpretation of the experimental data discussed supra, that only the first ballistic high-amplitude pulse arriving at the nonlinearity produces most of the harmonic content.

Despite its simplicity, the star-graph transmission line model contains the essential features present in the experimental nonlinear time-reversal system and yields results in good agreement with the experiments. The experimental system contains many more channels for propagation than the model transmission line network, which may account for the quantitative differences in the sona wave forms.

Reconstructions of time-reversed sonas in the model are imperfect due to absorption of signal at the nonreceiving port, and due to energy still reverberating in the system past the duration of the sona recording. The model diode simulates a stronger nonlinearity than is used in the single transmission line system. The model diode generates several harmonics of the initial signal, compared to the weak second harmonic observed in the system.

However, this detailed difference does not affect the principle of nonlinear time reversal. The signals created by the nonlinear object propagate through a linear scattering environment before they are recorded. Hence it does not matter what amplitude signal arrives at the nonlinear object, or on the details of the nonlinearity. As long as it generates harmonic response, the function of the nonlinear time reversal mirror is generic.

In both the model and the system, the addition of more propagation paths limits the power incident on the nonlinearity in the initial part of the time-forward step and the strength of the harmonics generated. The exclusive reconstruction of the nonlinear signal upon the location of the nonlinearity is demonstrated in the model, consistent with the system. The reconstructed nonlinear signal can be seen at the nonlinear element location, at a time delay equal to the propagation time between the nonlinear element location and the initial transmitting port. This justifies the interpretation that the initial ballistic signal arriving at the nonlinearity is responsible for the bulk of the nonlinear sona in the experiment.

The ability to "find" and, when needed, to track a nonlinear object and exclusively direct signals to it opens up a number of new applications, such as wireless power transfer with low background power level, precision hyperthermic treatment of tumors with minimal disruption to other tissue, or detecting changes in both the scattering environment and a nonlinear object.

These applications of the invention make use of wave propagation in strongly scattering media to create new functionality. The medium may be lossy to some extent, and these applications will still be effective. In order to at least partially overcome the effects of loss on time-reversed signals, exponential amplification [M. Fink, Geophysics 71, SI151 (2006); M. Fink, Phys. Today 50, 34 (1997)] and iterative time-reversal techniques may be applied [M. Fink, et al., Rep. Prog. Phys. 63, 1933 (2000)].

In addition to applications in pulse code modulation communication and image transmission, the principles of the present invention are effective in a number of areas of application, detailed infra.

Exclusive Communication Channel with a Nonlinear Element at an Arbitrary, Unknown, Location The problem of secure communication is very challenging. The idea is to communicate with one and only one location, to the exclusion of all other possible eavesdroppers. Ideally this communication should be done without knowledge of the receiver location, and in a manner that does not give away the location of the receiver to a third party.

A prior approach is to use line-of-sight channels to securely convey information from a sender to a receiver. However, due to the wave nature of the communication channel, some of this radiation will invariably leak out of the line-of-site path and be easily intercepted by a third party. This problem is exacerbated in a strongly scattering wave medium, where most likely a line-of-sight propagation channel does not exist at all. In this case the communications are open for all to monitor.

The present invention takes advantage of multiple scattering by spreading the information conveyed into many communication channels at the same time. An observer will capture this information in a scrambled manner that will be impossible to unscramble and understand the content of the message. The subject technique makes efficient use of many independent channels (diversity) to convey the message in a manner that is fairly insensitive to variations in the scattering environment.

The subject technique allows an exclusive communication channel to be formed between the sona collection point and the nonlinear element at an unknown location in the environment.

The location of the nonlinear element may also change dynamically, in addition to it being unknown, but this flexibility may come at the cost of a reduced communication rate as new sona will need to be collected for each bit that is to be transmitted. This communication channel is invisible to eavesdroppers at all other locations.

In addition, this communication method does not reveal the location of the receiver to an observer, thus making it more secure. Such an exclusive communication channel has been demonstrated using electromagnetic waves and nonlinear diodes. FIGS. 7A-7G, 8-9, 10A-10D, and 11A-11F discussed supra demonstrate how this communication system operates in the context of electromagnetic waves.

In another application of the subject invention, an exclusive communication channel may be created also using underwater acoustic waves or seismic waves in rock. In the latter case it would be possible to communicate with miners trapped deep underground using seismic wave communications or extremely low frequency electromagnetic waves. The miners are envisioned to be equipped with a suitable nonlinear acoustic or electromagnetic device to establish the communication link.

In the case of a geological fault, the present system and method may be used to direct a large amount of seismic energy to a particular nonlinear location with the goal of causing gradual slippage of the fault to relieve stress that could otherwise result in a catastrophic earthquake.

Another Area of Application for the Present Invention is Device Disabling or Disruption It is sometimes desirable to disrupt or disable communications devices, computers, or other electronics, in a certain environment. One way to do this is to physically destroy everything in the immediate vicinity of the object in question using kinetic devices. This 'brute-force' solution is clearly undesirable.

The present technique allows disruption or disabling of such devices with a minimum of collateral disruption. The subject system is capable of delivering energy to an electronic system or component in a highly localized (on the order of the wavelength of the wave) and short (on the order of a few cycles of the wave) time period. As such it represents the ultimate 'surgical precision' energy delivery method.

Hidden devices containing nonlinear elements may be disabled or disrupted through reconstruction of a time-reversed and amplified (at the amplifier unit 84 shown in FIG. 1B) sona into a high-energy pulse onto the device. By amplification and time-reversal of the frequency components originating from the device, an amplified signal is reconstructed at the device, either damaging or disabling the device.

The present invention permits the selective disruption or destruction of hidden objects, as long as they have a nonlinear element exposed to waves that propagate in the environment. Hidden devices containing nonlinear elements may be disabled or disrupted through reconstruction of a time-reversed, and perhaps amplified, sona into a high-energy pulse onto the device. Examples may include, but are not limited to, disabling of electronic surveillance devices, cell phones, or computing devices, disabling or jamming of triggers for improvised explosive devices, detection and destruction of hidden landmines or unexploded ordnance, and numerous of others.

The present concept can also be used to jam a communication receiver. If the receiver has a nonlinearity that can be exploited, the invention can create a signal at the receiver that overwhelms the signal expected from a distant source.

The Present Invention can be Also Successfully Used in Wave Therapy by Ingestion/Injection of Nonlinear Tags Currently, one strategy to destroy tumors inside the body is to heat them to a temperature that destroys the cells. This must be done without harming nearby healthy tissue. The present system is capable of carrying this process out non-invasively in a highly localized manner with a minimum of collateral damage. Microwave or RF thermal therapy (hyperthermia or RF/microwave ablation) is commonly employed to destroy tumors, but is not specific to the tumor tissue.

With the present system, a patient would swallow (or receive through an injection) nonlinear substances that are bio-chemically directed to a tumor location and accumulate there. The substances would have either electromagnetic or acoustic nonlinearities. The nonlinear time-reversal mirror is then set up between an external power source 32 and the tumor. Low power RF and microwave time-reversed sonas would be sent to the tumor, and reconstruct as high energy density pulses precisely at the location of the nonlinear substance.

The energy would be targeted in space and time with little energy being dissipated in nearby healthy tissue. The tumor hosting the nonlinear objects would then be destroyed upon absorption of RF/microwave radiation. A similar scenario could be carried out with acoustic waves directed to acoustic nonlinear substances accumulated in a tumor.

Another Field of Application for the Present System and Method is Wireless Power Transmission There is a great interest in wireless transfer of power from a source to a specific remote user. Currently, one of the hazards of wireless power transmission is the high energy density of the fields required to transmit the energy. This renders such systems incompatible with human life. The present technique improves on this idea. The object to receive the power will have a nonlinear 'tag' near, or as a part of, its receiving antenna. This 'tag' will be used to establish an exclusive 'power link' from a fixed source to the receiver at an unknown location. Energy is transferred by sending a time-reversed nonlinear sona that reconstructs as an intense pulse at the receiving rectenna (rectifying antenna). The rectified signal may be used to charge a battery or capacitor, or power the device in real time.

Reconstruction of a time reversed sona uses transmission of a broad-area coverage small-field signal, instead of using large EM-field beams for power transmission. As such, it is entirely compatible with human occupation of the environment, with no threat to the health of people or animals or plants.

The reconstructed pulse is also very brief in time and highly focused in space, leading to efficient energy transfer, and the technique does not suffer from traditional diffractive losses. Knowledge of the receiver location, or the creation of a high-energy-density beam channel, are not required and not utilized by the system. The object to be powered may also move about the environment at will, because it can be tracked by collecting new sonas at regular intervals to continuously re-establish the power link.

The invention is envisioned to work best if the source and object to be powered are inside a complex reverberant environment, such as an indoor environment. It can operate best at any frequency such that the wavelength is significantly smaller than the enclosure size. The present method is pulsed and not continuous, it utilizes a short duration for the energy delivery, and this may be of benefit in applications. The subject method and system also is believed to benefit from iterative time-reversal to reduce side-lobes which decrease the efficiency of the energy transfer.

Time-reversal of electromagnetic signals in a system containing a passive, harmonic-generating nonlinear element was demonstrated, in which reverse propagation of the time-reversed received nonlinear excitations forms a reconstruction exclusively upon the nonlinear element. Overlapping of multiple sonas allowing resolvable reconstructions of distinct pulses is also demonstrated, allowing for exclusive transmission of data by a series of constructed sonas.

The utility of the subject technique is demonstrated by transmission of images to the nonlinearity by means of overlapping broadcast of single-pulse nonlinear sonas.

A model of the nonlinear system is constructed, using a star-graph network of transmission lines, with a passive model diode terminating one line as a nonlinear element in the system. This model recovers features seen in the experimental system, and models time reversal of linear and nonlinear signals in good agreement with the experimental results.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A method of signal transmission in wave propagating environments, comprising the steps of:
   (a) exposing at least one non-linear object to waves propagating in a wave propagating environment of interest, thereby causing generation of intermodulation product signals originating at said at least one nonlinear object and propagating to a receiving port provided in said wave propagating environment of interest, and establishing a linear port in said wave propagating environment of interest for transmission of said waves into said wave propagating environment of interest;
   (b) detecting at said receiving port a full sona signal including at least one nonlinear sona corresponding to said intermodulation product signals, and a linear sona corresponding to said waves reverberating in said waves propagating environment of interest;
   (c) extracting said at least one nonlinear sona and said linear sona from said full sona signal at said receiving port;
   (d) time-reversing said linear and nonlinear sonas; and
   (e) transmitting said time-reversed at least one nonlinear sona and said time-reversed linear sona from said receiving port into said wave propagating environment of interest, wherein said time-reversed at least one nonlinear sona propagates in said wave propagating environment of interest to, and reconstructs exclusively at a location of said at least one nonlinear object, thus producing a nonlinear time-reversed signal, thereby establishing an exclusive wave-enabled communication channel between said at least one nonlinear object and said receiving port, and
   wherein said time-reversed linear sona reconstruct exclusively at said linear port, thus obtaining a linear time-reversed signal exclusively at a location of said linear port.

2. The method of claim 1, further comprising the steps of:
   in said step (a), exposing said at least one nonlinear object to pulsed said waves propagating in the wave propagating environment of interest, thereby inducing a pulsed nonlinear response of said at least one nonlinear object, including pulsed harmonic signals,
   in said step (b), detecting at said receiving port said full sona including said intermodulation product and/or said pulsed harmonic signals, and
   in said step (e), reconstructing time-reversed said pulsed harmonic signals.

3. The method of claim 1, further comprising the steps of:
   in said step (b), applying a Fast Fourier transform computation to said detected full sona signal,
   wherein the Fast Fourier Transform results in combination of signals at a wave frequency $f_{pulse}$, harmonic frequency $f_{nonlinear}$ of the excitations of said at least one nonlinear object, and signals at intermodulation frequencies, including $f_{pulse} + f_{nonlinear}$.

4. The method of claim 3, further comprising the steps of:
   in said step (c), applying a band-pass filter centered at said intermodulation frequencies, including $f_{pulse} + f_{nonlinear}$, to said full sona signal to extract said nonlinear sona therefrom.

5. The method of claim 2, further comprising the steps of:
   in said step (c), applying a bandpass filter centered at said harmonic frequency $f_{nonlinear}$ to said full sona to extract said nonlinear time-reverse pulsed harmonic signals.

6. The method of claim 1, further comprising the steps of:
   in said step (c), applying a band-pass filter centered at a wave frequency $f_{pulse}$ to said full sona signal to extract said linear sona therefrom.

7. The method of claim 1, further comprising the steps of:
   after said step (c), applying a pulse code modulation to said nonlinear sona received through the steps of:
   (f) assigning a 1 bit value to said non-linear sona received at said receiving port, thereby creating a 1 bit sona,
   (g) creating a 0 bit sona from said nonlinear sona received at said receiving port,
   (h) creating a coded message including a series of said 1 bit sonas and said 0 bit sonas interposed in a predetermined sequence,
   (i) in said step (e), transmitting said coded message from said receiving port into said waves propagating environment of interest,
   (j) detecting presence and absence of reconstructed nonlinear time-reversed signals at said at least one nonlinear object, wherein said 1 bit sonas are detected at said at least one nonlinear object, and wherein said 0 bit sonas are not reconstructed at said at least one nonlinear object,
   (k) detecting non-linear time-reversed signals, and
   (l) decoding said detected nonlinear time-reversed signals.

8. The method of claim 7, further comprising the steps of:
   in said step (g), applying Fast Fourier Transform to said nonlinear sona, thereby transforming said nonlinear sona into the frequency domain,
   adding a random Gaussian noise to the phase information of said nonlinear sona in frequency domain, thereby creating a noisy-phase signal, and
   applying an Inverse Fast Fourier transform to said noisy-phase signal to transform said noisy-phase signal into the time domain.

9. The method of claim 1, further comprising the steps of:
   after said step (c), encoding an image by means of said nonlinear sona, and
   in said step (e), broadcasting said encoded image into said wave propagating environment of interest, thereby directing said image to be reconstructed exclusively at the location of said at least one nonlinear object.

10. The method of claim 1, further comprising the steps of:
    after said step (c), encoding an image by means of said linear sona, and
    in said step (e), broadcasting said encoded image into said wave propagating environment of interest, thereby directing said image to be reconstructed exclusively at the location of said linear port.

11. The method of claim 1, further comprising the steps of:
    after said step (b), establishing the presence of said at least one nonlinear object in said wave propagating environment of interest if frequency components outside the said wave bandwidth are detected, in said step (d), time-reversing and amplifying said frequency components originating from said at least one nonlinear object, and in said step (e), reconstructing said amplified time-reversed signal at said at least one nonlinear object, thereby affecting the operation mode thereof.

12. The method of claim 1, wherein said wave propagating environment of interest is a biological system, further comprising the steps of:

prior to said step (a), introducing non-linear substances having non-linear dynamics to a biological system, wherein said nonlinear substances are bio-chemically directed to and accumulating at a location of interest in said biological system, and in said steps (d) and (e), time reversing said at least one non-linear sona received from said non-linear substances, and transmitting said time-reversed at least one non-linear sona into said biological system to be reconstructed exclusively at said location of interest.

13. The method of claim 12, wherein said location of interest contains a tumor, and wherein said at least one time-reversed non-linear sona includes a radiation wave capable of destroying tissues of the tumor.

14. The method of claim 1, further comprising the steps of:

in a wireless power transfer system, providing a nonlinear tag at a receiving antenna of an object to receive power, coupling a power source to said receiving port, and in said step (e), transmitting power from said power source to said receiving antenna through an exclusive communication channel established between said nonlinear tag and said power source using said nonlinear time-reversed signal.

15. The method of claim 1, wherein said waves include either of electromagnetic, acoustic, seismic, quantum mechanical, and biological waves.

16. The method of claim 1, wherein said at least one nonlinear object includes either of diodes, transistors, electrostatic-discharge diodes, metal-insulator-metal junctions, active circuits (electromagnetic), cracks (acoustic), geological faults, mineral and petroleum deposits (seismic), or superconductors, superfluids, p/n junctions, quantum dots, nanoparticles (quantum mechanical), magnetic particles, biological, and bio-chemical substances.

17. A system for signal transmission in wave propagating environments, comprising:

a waves propagating environment of interest, a receiving port in said waves propagating environment of interest, at least one non-linear object exposed to said waves in said waves propagating environment of interest and producing intermodulation product or harmonic signals originating thereat and propagating to said receiving port, a linear source of waves, a signal detector coupled to said receiving port and configured to detect a full sona signal including at least one non-linear sona corresponding to said intermodulation product and/or harmonic signals and a linear sona corresponding to said waves reverberating in said waves propagating environment of interest, a first bandpass filter centered at frequencies of said intermodulation product or harmonic signals, and applied to said full sona to extract at least one nonlinear sona therefrom, a second bandpass filter centered at frequencies of said waves and applied to said full sona to extract a linear sona therefrom, a time-reversing unit coupled to said receiving port and configured to apply time-reversion routine to said at least one nonlinear sona, and a transmitter coupled to said receiving port and said time-reversing unit and configured to transmit said time-reversed at least one nonlinear sona into said waves propagation environment of interest, wherein said transmitted time-reversed at least one nonlinear sona propagates towards a location of said at least one nonlinear object and reconstructs exclusively thereat, thus attaining an exclusive communication channel extending between said at least one nonlinear object and said receiving port, wherein said linear sona is time-reversed in said time-reversing unit, and transmitted by said transmitter into said waves propagating environment, and wherein said time-reversed linear sona reconstruct exclusively at a location of said linear source of waves.

18. The system of claim 17, wherein said waves propagating environment included pulsed waves, wherein said at least one nonlinear object, being exposed to said pulsed waves, produces pulsed harmonic signals, and wherein said nonlinear pulsed time-reversed harmonic signals reconstruct exclusively at said location of said at least one nonlinear object.

19. The system of claim 17, further including a processor unit operatively coupled to said receiving port and configured to apply a pulse code modulation routine to said at least one nonlinear sona, said pulse code modulation routine being configured to:

create a 1 bit sona from said at least one nonlinear sona received at said receiving unit;

to create a 0 bit sona by applying a Fast Fourier transform to thereby transforming said nonlinear sona into the frequency domain, adding a random Gaussian noise to the phase information of said nonlinear sona in frequency domain, thereby creating a noisy-phase signal, and applying an Inverse Fast Fourier transform to said noisy-phase signal to transform the same into the time domain; and creating, by said processor unit, an encoded message including a series of said 1 bit sonas and 0 bit sonas interposed in a predetermined sequence;

wherein said transmitter is configured to transmit said encoded message from said receiving port into said waves propagating environment of interest; and wherein said processor unit is further configured to:

measure the reconstructed nonlinear time-reversed signals at the location of said at least one nonlinear object, wherein said 1 bit sonas are detected at said at least one nonlinear object, and wherein said 0 bit sonas are not reconstructed at said at least one nonlinear object, and to decode said measured reconstructed nonlinear time-reversed signals.

20. The system of claim 17, further including:

an image source, a processor unit operatively coupled to said image source and said receiving port and configured for encoding said image by said nonlinear sona, wherein said transmitter unit is coupled to said processing unit to broadcast time-reversed said encoded image into said wave propagating environment of interest, thereby directing said time-reversed encoded image for reconstruction exclusively at said at least one nonlinear object.

21. A system of claim 17, wherein said at least one nonlinear object is a nonlinear substance compatible with biological environment and bio-chemically directed and accumulated at a location of interest in said waves propagating environment of interest, and wherein said time-reversed nonlinear sona includes radiation waves capable of destroying biological tissues exclusively at said location of interest.

\* \* \* \* \*